US008655294B2

(12) United States Patent
Walker et al.

(10) Patent No.: US 8,655,294 B2
(45) Date of Patent: Feb. 18, 2014

(54) METHOD AND APPARATUS FOR POSITION SIGNAL ASSISTED WINDOW PLACEMENT

(75) Inventors: Gordon K. Walker, Poway, CA (US); Murali R. Chari, San Diego, CA (US); Fuyun Ling, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 693 days.

(21) Appl. No.: 12/787,062

(22) Filed: May 25, 2010

(65) Prior Publication Data

US 2010/0304699 A1 Dec. 2, 2010

Related U.S. Application Data

(60) Provisional application No. 61/181,003, filed on May 26, 2009.

(51) Int. Cl.
*H04B 1/16* (2006.01)
(52) U.S. Cl.
USPC .......... 455/226.3; 455/226.1; 455/226.2; 375/260; 375/340; 375/267; 375/342; 375/354; 370/342; 370/350
(58) Field of Classification Search
USPC .............. 375/260, 340, 267, 342, 354; 455/226.3, 226.1, 226.2; 370/342, 350
See application file for complete search history.

(56) References Cited

U.S. PATENT DOCUMENTS

| 6,731,622 B1 | 5/2004 | Frank et al. |
| 2006/0222099 A1 | 10/2006 | Varadarajan et al. |

FOREIGN PATENT DOCUMENTS

| EP | 0963068 A2 | 12/1999 |
| EP | 1482652 A1 | 12/2004 |
| WO | WO0169878 A1 | 9/2001 |
| WO | WO2007038552 | 4/2007 |

OTHER PUBLICATIONS

Held I, et al., "Doppler-Adaptive Multipath Window Tracking for WCDMA FDD-Uplink", vol. 2, May 6, 2002, May 9, 2002, pp. 713-717, XP001214384, New York, NY : IEEE, US DOI: DOI:10.1109/VTC.2002.1002579 ISBN: 978-0/7803-7484-.
International Search Report and Written Opinion—PCT/US2010/036201, International Search Authority—European Patent Office—Feb. 28, 2011.
Nagata S, et al.,"Accurate FFT Processing Window Timing Detection Based on Maximum SIR Criterion in OFCDM Wireless Access", IEICE Trans. Commun., vol. E88-B, No. 2, Feb. 1, 2005, pp. 552-560, XP001225518, Communications Society, Tokyo, JP ISSN: 0916-8516, DOI: DOI:10.1093/1ETC0M/E88-B.2.552.
Taiwan Search Report—TW099116924—TIPO—Mar. 28, 2013.

*Primary Examiner* — Junpeng Chen
(74) *Attorney, Agent, or Firm* — Fulbright & Jaworski LLP

(57) ABSTRACT

Methods and circuits for positioning a signal sampling window within a wireless receiver device for use in a multi-transmitter wireless broadcast network include generating a long channel model based upon a signal identifying transmitters that can be processed without aliases, and positioning the signal sampling window based upon the long channel model. For example, in a MediaFLO® broadcast, the long channel model may be generated by receiving positioning pilot channel (PPC) signals. Positions for the signal sampling window may be determined by identifying hypothetical signal sampling window positions, calculating signal to interference and noise ratio (SINR) values for each identified hypothetical, and selecting the hypothetical with the best SINR. Using a long channel model to position the signal sampling window may provide improved window placement, reduce destructive aliasing, and reduce a time guard in the window placement. The long channel model may be used in conjunction with terrain databases.

76 Claims, 10 Drawing Sheets

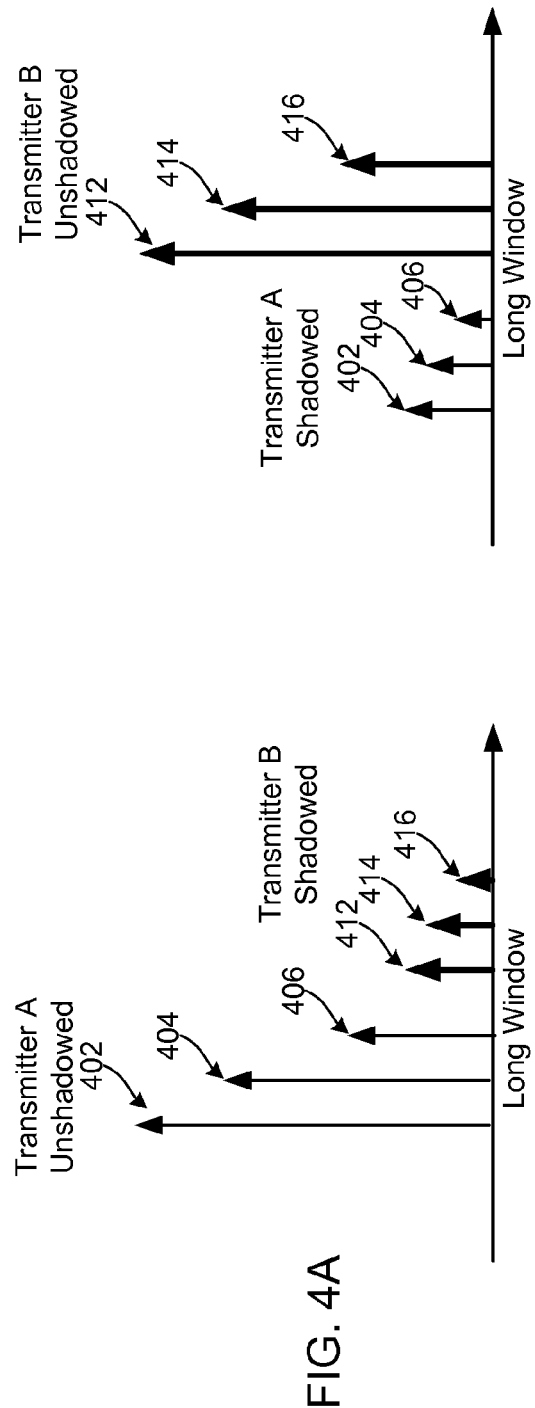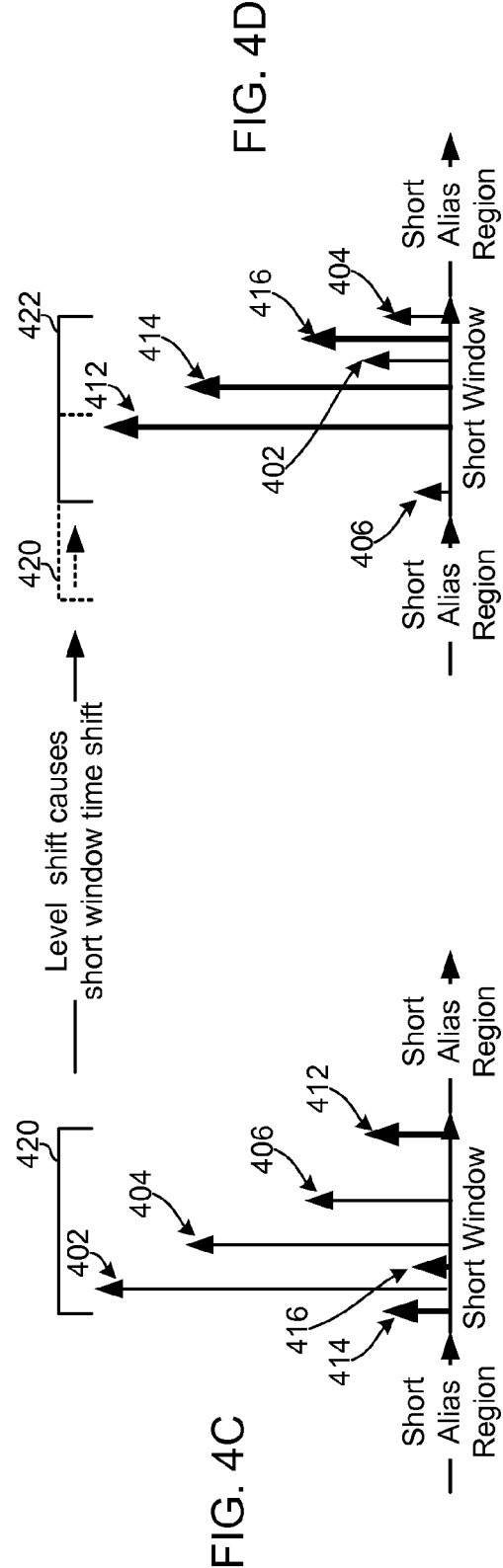

METHOD AND APPARATUS FOR POSITION SIGNAL ASSISTED WINDOW PLACEMENT

RELATED APPLICATIONS

This application claims the benefit of priority to U.S. Provisional Patent Application 61/181,003 entitled "Method and Apparatus for Position Signal Assisted Window Placement" filed May 26, 2009, the entire contents of which are hereby incorporated by reference.

TECHNICAL FIELD

The present invention relates generally to the operation of mobile wireless networks, and more particularly to methods for detecting wireless networks to conserve device battery power.

BACKGROUND

A recent development in wireless communication technology is the deployment of mobile broadcast television formatted for reception by mobile and handheld personal television receivers. To support the unique requirements of mobile television receivers, the broadcast wireless network typically employs a plurality of transmitters which transmit substantially the same signal at approximately the same time so that receiver devices may continuously receive the broadcast signal no matter where they are located within the broadcast coverage area. Broadcasting the same signal simultaneously from multiple transmitters positioned throughout a broadcast coverage area increases the likelihood that a receiver device moving through the broadcast area will always be able to receive the signals from at least one transmitter. However, multiple transmissions of the same signal from geographically dispersed transmitters can complicate the process by which receivers synchronize their reception and decoding circuitry with the broadcast signal. Since the signals from the various transmitters, as well as multipath signals reflected off of buildings and mountains, will arrive at slightly different times due to the different path length traveled by broadcast signals, receiver devices are configured to synchronize their signal sampling processes for improved reception quality and reduced noise.

For wireless communication systems, such as the MediaFLO® Forward Link Only (FLO) mobile broadcast television service, real-time and non-real-time communication services may be formatted onto forward transmission frames and distributed to various wireless devices within the wireless communication network. The forward transmission direction refers to communication from the wireless network infrastructure, for example, base stations or access nodes, to wireless devices, for example, mobile personal television receivers, mobile phones, etc. In one example, the transmission frames provide data slots for delivering information content (e.g., video, audio, news, data reports, etc.) to users within the wireless network. In addition, the transmission frames may also include a positioning pilot channel (PPC) to facilitate auxiliary functions for the benefit of the wireless devices, such as transmitter identification and mobile device position determination.

SUMMARY

The various embodiment systems, circuits and methods provide an improved receiver apparatus and acquisition algorithm using information regarding the current location and/or movement of the receiver device. The various embodiments may include a method of positioning a signal sampling window in a wireless receiver device, including generating a long channel model of transmitters within reception range using a transmitted signal that enables determination of a virtually alias-free long channel estimate, and using the long channel model to position the signal sampling window. The method may further include continuously refining the long channel model of transmitters based upon ongoing reception of the transmitted signal, or recalculating a signal to interference and noise ratio (SINR) estimate. In the method, using the long channel model to position the signal sampling window may include using the long channel model to identify one or more signal sampling window position hypotheticals, calculating a signal to interference and noise ratio (SINR) for each of the one or more signal sample window position hypotheticals, and positioning the signal sampling window at the one or more signal sampling window position hypotheticals having the best calculated SINR. SINR may be calculated as the ratio of combining and interfering signals of various carriers plus channel noise, in which the calculation of the ratio of combining carriers to interfering carriers is based upon combining characteristics of the wireless receiver device. The method may further include monitoring trends in positions of the wireless receiver device, wherein using the long channel model to position the signal sampling window includes using the long channel model to identify one or more signal sampling window position hypotheticals, calculating a signal to interference and noise ratio (SINR) for each of the one or more signal sampling window position hypotheticals, identifying the one or more signal sample window position hypotheticals having a best SINR, and positioning the signal sampling window based upon the identified signal sampling window position hypothetical having a best SINR and the monitored trends in position of the wireless receiver device. The method may further include determining a location of the receiver device and comparing the location of the receiver device to a terrain database to identify transmitters that are unshadowed by terrain at the location of the receiver device, wherein using the long channel model to position the signal sampling window includes selecting a signal sampling window position based on the long channel model and transmitters which are not shadowed by terrain at the location of the receiver device. The method may further include logging the selected signal sampling window position and the determined location of the receiver device in memory. The method may further include testing a first signal sampling window position by predicting a signal to interference and noise ratio (SINR) with the signal sampling window in a second position different than the first position, repositioning the signal sampling window to the second position, measuring the SINR with the signal sampling window in the second position, comparing the predicted SINR to the measured SINR, and optionally, using a heuristic method for positioning the signal sampling window when the predicted SINR differs significantly from the measured SINR. The method further including selecting an alternate signal sampling window hypothesis that has similar predicted performance, but at a different window location when the predicted SINR differs significantly from the measured SINR for the most recent utilized hypothesis. The wireless receiver device may be configured to receive transmissions from a MediaFLO® broadcast network, and method may further include generating the long channel model comprises receiving positioning pilot channel (PPC) signals from transmitters in the MediaFLO® broadcast network and using a time of arrival of the PPC signals and known positions of the transmitters. Generating the long channel model may include compensating for transmitter signal timing offsets. Compensating for transmitter signal timing offsets may include receiving a data table identifying system transmitter time offsets and locations, and adjusting the time of arrival of the PPC signals for each transmitter by its transmitter time offset. Compensating for transmitter signal timing offsets may include receiving a data table identifying system transmitter PPC offsets, transmitter times and locations, and adjusting the time of arrival of the PPC signals for each transmitter to system time. The method may further include monitoring trends in estimated SINR estimates for a plurality of signal sampling window position hypotheticals, and repositioning the signal sampling window position to the second window position hypothetical when it is determined that an SINR estimate trend of a current window position hypothetical is decreasing while and an SINR trend of a second window position hypothetical is increasing and the SINR estimates of the current and second window position hypotheticals are close. The method may further include generating a medium channel model that is longer than the short signal model window and shorter than the long channel model, and calculating the medium channel length hypotheticals and comparing the SINR values for both medium and short channel window positions to select the most favorable. The method may further include determining when a high Doppler shift condition exists, estimating SINR values for multiple position channel estimation windows, choosing a best SINR for both the short and medium channel estimates, and increasing the medium window SINR requirement when it is determined that a high Doppler shift condition exists.

A further embodiment may include a wireless receiver device including a receiver circuit coupled to a processor in which the processor is configured with processor executable instructions to perform operations of the method described above. A further embodiment may include a wireless receiver device including means for performing the operations of the method described above. A further embodiment includes a non-transitory processor-readable storage medium having stored thereon processor-executable instructions configured to cause a processor of a wireless receiver device to perform operations of the method described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 1B is a system block diagram of a multi-transmitter broadcast communication system and a wireless receiver illustrating the multiple signal sources that the receiver device must deal with.

FIGS. 4A and 4B are illustrations of a long window views of received signals in a multi-transmitter broadcast system in two spaced apart locations FIGS. 4C and 4D are illustrations of short sampling window views of received signals that may be observed in the signal environment illustrated in FIGS. 4A and 4B respectively.

DETAILED DESCRIPTION

Figure 1A:
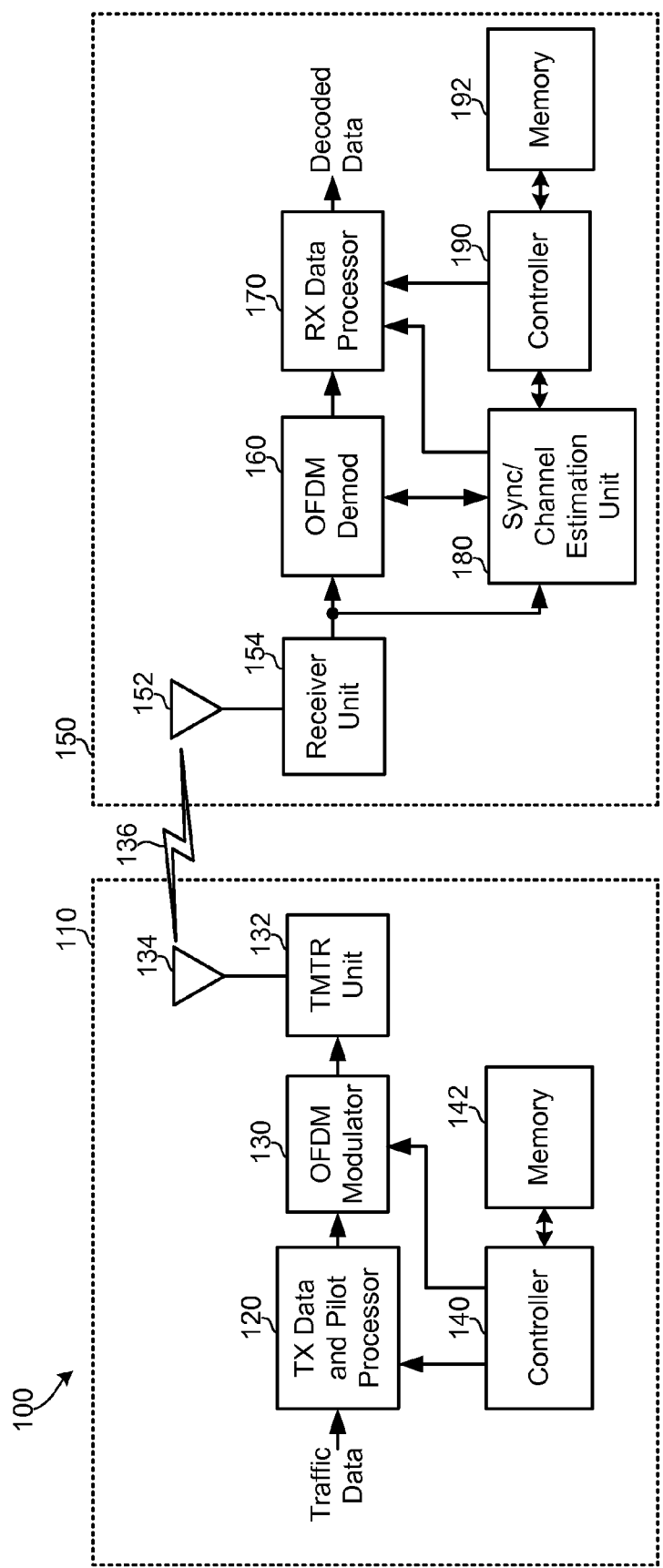
FIG. 1A is a block diagram of a base station and a wireless receiver in an orthogonal frequency division multiplexing (OFDM) system according to an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any embodiment described herein as "exemplary" is not necessarily to be construed as preferred or advantageous over other embodiments.

As used herein, the terms "mobile device" and "receiver device" refer to any one or all of cellular telephones, personal data assistants (PDAs), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, interactive gaming devices, portable television devices (e.g., FLO TV® devices), and similar personal electronic devices which may include a programmable processor, memory, and a wireless communication receiver or transceiver circuit.

While the description of the embodiments herein refer to MediaFLO® as an example of a suitable broadcast technology in which the various embodiments may be implemented, a number of different mobile broadcast television services and broadcast standards are available or contemplated in the future, all of which may implement and benefit from the various embodiments. Such services and standards include, e.g., Open Mobile Alliance Mobile Broadcast Services Enabler Suite (OMA BCAST), Digital Video Broadcast IP Datacasting (DVB-IPDC), Digital Video Broadcasting-Handheld (DVB-H), Digital Video Broadcasting-Satellite services to Handhelds (DVB-SH), Digital Video Broadcasting-Handheld 2 (DVB-H2), Advanced Television Systems Committee-Mobile/Handheld (ATSC-M/H), and China Multimedia Mobile Broadcasting (CMMB). Therefore, references to MediaFLO® technology or use of MediaFLO® terminology herein are not intended to limit the scope of the claims to MediaFLO® unless specifically recited.

In the various embodiments, a signal that is available in a multi-transmitter broadcast network may be used by a wireless receiver device to generate a model that identifies the nominal signal propagation times, distances, or relative signal arrival times for each transmitter in the network. By generating a model that spans the entire delay spread of all signals that may be received by the receiver device, aliasing of received signals is avoided. Using this "long window" or "long channel model" the receiver device can determine an appropriate offset transmit timing on a per-transmitter basis. The long channel model will typically be much longer than the short sampling window or short channel estimate to ensure it is alias-free. An alias-free long channel model enables the receiver device to adjust the sampling window timing to maximize the received signal to interference and noise ratio (SINR). The SINR is a calculation of an SINR estimate based on a current window position and the decomposed signal levels. In the various embodiments, the long channel model allows the device to assign specific arrivals to a transmitter and hence calculate whether the energy is signal or interference. In this manner, more accurate positioning of the sampling time window may be achieved than is typically accomplished using conventional heuristic window positioning algorithms. With knowledge of the transmitter locations, receiver devices can identify a closest transmitter and accurately position the sampling time window for that transmitter based on the long channel model. In an embodiment, the long channel model may allow the receiver device to eliminate or minimize the impact of far out (in time) signals. In an embodiment, a receiver device with knowledge of terrain features within the broadcast area may use the long channel model to position the timing window to accommodate sudden shadowing.

MediaFLO® technology wireless broadcast networks include a signal transmission, known as the positioning pilot channel (PPC), which includes information identifying individual transmitters. The PPC signals were originally included in MediaFLO® to enable geo location features, since receiver devices can determine their accurate location by triangulation based on the time of arrival of transmission signals from sources with known locations. In MediaFLO®, the positioning waveform structure is intentionally designed to allow identification of individual transmitters and ranging at relative distances that significantly exceeds the useful data communication path. For example, data communications typically requires a carrier to noise (C/N) ratio of at least 10 dB, but ranging and transmitter identification may be accomplished at a C/N as low as −10 dB. Additionally, a receiver device will know its combining and interference characteristics. In MediaFLO®, each transmitter transmits its PPC signal in a round-robin manner so that only a single transmitter broadcasts its PPC message in a given super-frame. The round-robin transmission of PPC signals requires 16 seconds to complete, allowing for 16 separate transmitters in the wireless network. Thus, within a 16 second period of time, Media-FLO® receiver devices can unambiguously determine the signal arrival timing of transmissions from each transmitter within the broadcast area (or at least those transmitters from which the receiver device receives transmissions). Other broadcast technologies may include different signals which may similarly be used by receiver devices to unambiguously identify in time the sources (i.e., transmitters or transmitter distances) of various received signals.

Since the PPC signal enables the MediaFLO® receiver device to unambiguously identify each transmission source, receiver devices can be configured to use this information to construct a very long channel model based on PPC (or other pilot structures). Such a very long channel model will be alias-free because the timing model exceeds the path length delay of every transmitter. The process of generating the long channel model may take into account broadcast delays which may be introduced into individual transmitters by broadcasters as part of their efforts to improve the overall network performance with across the broadcast coverage area. Thus, the long channel model enables receiver devices to correct for radiation time offsets of the PPC signals relative to data signals and other pilots, if present. The process of accounting for transmission delays may be supported by a list of system transmitter time offsets and locations that the broadcaster may transmit as a table or other data structure when the PPC signal is sent. This may enable the receiver devices to generate a long channel model that corrects for an entire transmitter signal offset relative to system time. This technique may be supported with PPC offset and transmitter time and position information broadcast as a table or other data structure.

In a communications system that combines signals from multiple transmitters e.g. OFDM, the time over which the signal can be constructively combined is limited by the combination of the channel estimation and the duration of the cyclic prefix. When signal arrival spread exceeds the nominal duration of the nominal channel estimation, the channel can "wrap around" or "alias" so that the apparent location in time within the sampling window of the various arrivals may not reflect actual flight time. Heuristic window position methods based solely on received signal levels or apparent first arrival may be confused by the presence of strongly shadowed transmitters. Some of the potential combine duration may have to be sacrificed to allow for early signals appearing, and failure of this mechanism can result in aliasing. For example, if the sampling window is set too late in time, an early arriving signal from a nearby transmitter may appear as a late arriving strong signal. As a further example, if the sampling window is set too early, late arriving signals, such as from distant transmitters, may appear as early arriving weak signals. Such signals appearing in an incorrect time within the sampling window are known as "aliases" and can lead to interference with the received signal, which reduces the signal to interference and noise ratio (SINR) and thus can degrade the receiver's performance.

In the various embodiments, the use of the MediaFLO® PPC (or other signals) to generate a long channel model allows a receiver device to have better sample window placement than may be possible using conventional heuristic techniques. For example, one conventional method for positioning the sampling window involves setting the window at a predefined time offset in advance of the strongest received signal. This technique presumes that the strongest received signal will be from the nearest transmitter. However, in order to accommodate closer transmitters that may be temporarily shadowed and to adjust for errors in the timing of the received signal, the timing window is typically advanced a predetermined amount of time (referred to as the "time guard") to ensure that an earlier arriving stronger signal can be included at the start of the sampling window. However, if the strongest received signal is not from the closest transmitter (as may occur in situations where the closest transmitter is temporarily shadowed or a multipath signal reflected from a large structure has a higher strength) some potential degrading aliasing conditions can occur. By generating an unambiguous model of the positions of all transmitters, some assumptions used in positioning the window (e.g., the strongest signal is the first arrival) can be eliminated. Further, the embodiments may enable the time guard to accommodate new signals popping up to be reduced or eliminated, as the long channel model estimate may accurately predict the earliest possible signal. Similarly, "candidates" for the nearest transmitter may be identified before they become significant such as when the receiver device is moved towards a transmitter and away from others. Potential SINR degradation due to so called "forward wrap around" can be eliminated. Further, the window placement can be set by receiver devices based on an estimated maximum achievable SINR based on the long channel model and the receiver device's characteristics.

A wireless system (e.g., MediaFLO) can offset the transmit timing on a per-transmitter basis. Therefore, it is possible to adjust the timing window at the receiver to maximize the received signal to interference and noise ratio (SINR) based on the adjusted arrival times. In one embodiment, the long alias-free time of the PPC signals allows the elimination or minimization of the impact of far out (in time) signals.

In an embodiment, information may be encoded in orthogonal frequency division multiplexing (OFDM) signals, but the systems and methods may be useful in other wireless communication technologies. An OFDM communication system may use a transmission structure in which data is transmitted in frames or super-frames, with each frame having a particular time duration. Different types of data (e.g., traffic/packet data, overhead/control data, pilot, and so on) may be sent in different parts of each frame. The term "pilot" generically refers to data and/or transmission patterns that are known in advance by both the transmitter and a receiver, and therefore can be recognized by the receiver as communicating predetermined information, such as a timing or synchronization pattern.

A receiver configured to receive OFDM signals typically needs to obtain accurate frame and symbol timing in order to properly recover the data sent by the transmitter. For example, the receiver may need to know the start of each frame in order to properly recover the different types of data sent in the frame. The receiver often does not know the time at which each OFDM symbol is sent by the transmitter nor the propagation delay introduced by the communication channel, or has a system clock that is out of synch with the time standard used by the transmitter. This is particularly true when the receiver's receiver circuitry is first energized. The receiver needs to ascertain the timing of each OFDM symbol received via the communication channel in order to properly perform the complementary OFDM demodulation of the received OFDM symbol.

FIG. 1A illustrates a block diagram of a base station 110 and a wireless receiver device 150 in an OFDM system 100 according to an embodiment. The base station 110 is generally a fixed station and may also be referred to as a base transceiver system (BTS), an access point, or by some other term. Wireless receiver devices 150 may be fixed or mobile and may also be referred to as a user terminal, a mobile station, or by some other term. The wireless receiver device 150 may be a portable unit such as a personal mobile television receive device, a mobile television receiver device in an automobile, a cellular phone, etc.

At the base station 110, a transmitter (TX) data and pilot processor 120 receives different types of data (e.g., traffic/packet data and overhead/control data) and processes (e.g., encodes, interleaves, and symbol maps) the received data to generate data symbols. Transmitted information may include data symbols (which is a modulation symbol for data), and pilot symbols which are modulation symbol for synchronization purposes. Modulation symbols may be a complex value representing a point in a signal constellation for a modulation scheme (e.g., M-PSK, M-QAM, and so on). The TX data and pilot processor 120 also processes pilot data to generate pilot symbols and provides the data and pilot symbols to an OFDM modulator 130.

The OFDM modulator 130 multiplexes the data and pilot symbols onto the proper sub-bands and symbol periods and performs OFDM modulation on the multiplexed symbols to generate OFDM symbols, as described in more detail below.

A transmitter (TMTR) unit 132 converts the OFDM symbols into one or more analog signals and further conditions (e.g., amplifies, filters, frequency upconverts, etc.) the analog signal(s) to generate a modulated signal 136. The base station 110 transmits the modulated signal 136 from an antenna 134 for reception by wireless receivers in the OFDM system 100.

At the wireless receiver 150, the transmitted signal 136 from the base station 110 is received by an antenna 152 and provided to a receiver unit 154. The receiver unit 154 conditions (e.g., filters, amplifies, frequency downconverts, etc.) the received signal and digitizes the conditioned signal to obtain a stream of input samples. An OFDM demodulator 160 performs OFDM demodulation on the input samples to obtain received data and pilot symbols. The OFDM demodulator 160 also performs detection (e.g., matched filtering) on the received data symbols with a channel estimate (e.g., a frequency response estimate) to obtain detected data symbols, which are estimates of the data symbols sent by base station 110. The OFDM demodulator 160 provides the detected data symbols to a receive (RX) data processor 170.

A synchronization/channel estimation unit (SCEU) 180 receives the input samples from the receiver unit 154 and performs synchronization to determine frame and symbol timing, as described below. The SCEU 180 also derives the channel estimate using received pilot symbols from the OFDM demodulator 160. The SCEU 180 provides the symbol timing and channel estimate to the OFDM demodulator 160 and may provide the frame timing to the RX data processor 170 and/or a controller 190. The OFDM demodulator 160 uses the symbol timing to perform OFDM demodulation and uses the channel estimate to perform detection on the received data symbols.

The RX data processor 170 processes (e.g., symbol demaps, deinterleaves, decodes, etc.) the detected data symbols from the OFDM demodulator 160 and provides decoded data. The RX data processor 170 and/or controller 190 may use the frame timing to recover different types of data sent by the base station 110. In general, the processing by the OFDM demodulator 160 and the RX data processor 170 may be complementary to the processing by OFDM modulator 130 and TX data and pilot processor 120, respectively, at the base station 110.

Controllers 140, 190 may direct operations at the base station 110 and a wireless receiver 150, respectively. The controllers 140, 190 may be processors and/or state machines. Memory units 142, 192 may provide storage for program codes and data used by controllers 140 and 190, respectively. The memory units 142, 192 may use various types of storage medium to store information.

Figure 1B:
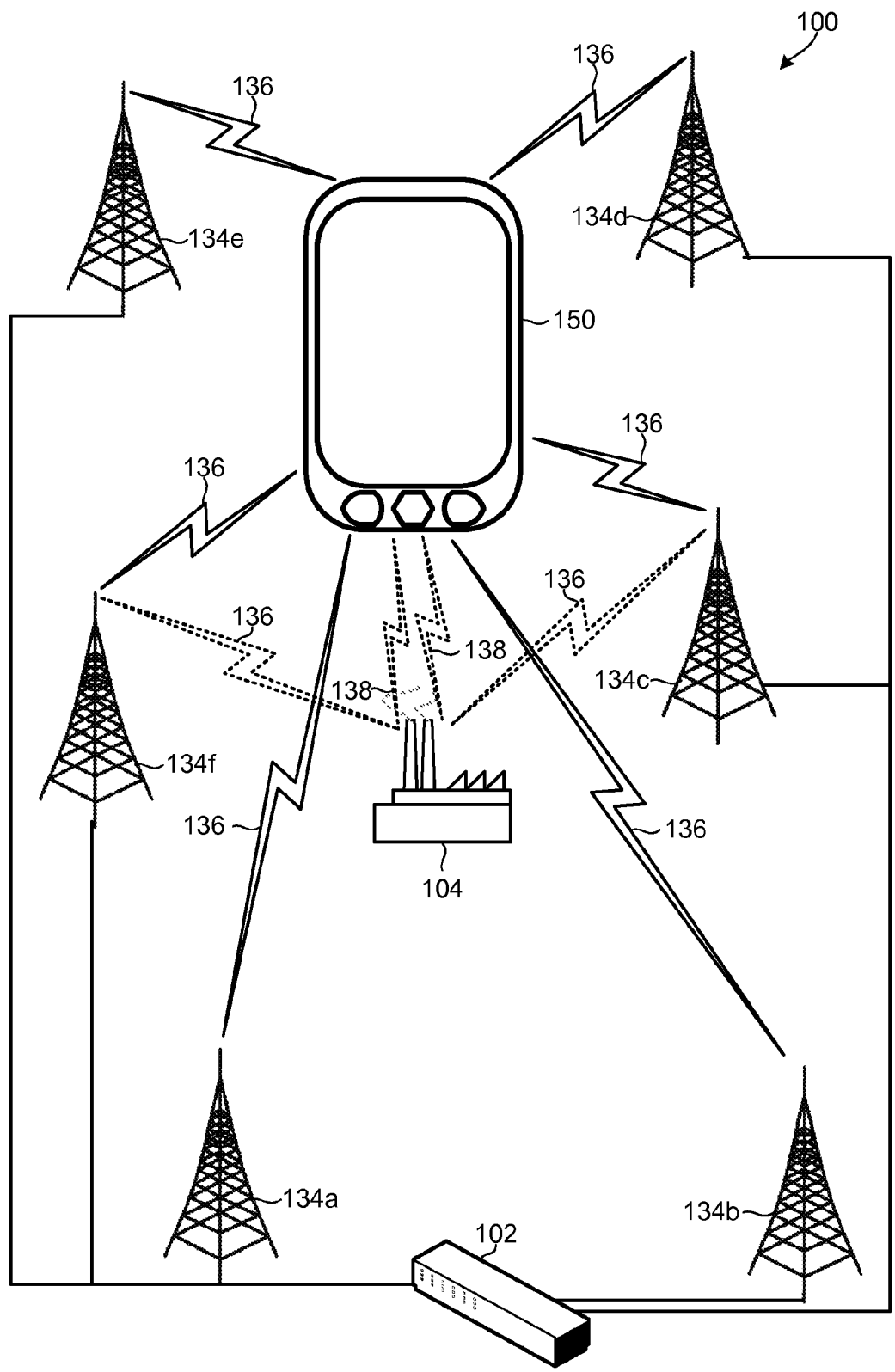

In a single frequency network, such as a MediaFLO® broadcast network, multiple transmitters 134 may be deployed across a broadcast coverage area so that a receiver 150 may receive broadcast signals throughout the coverage area. A simplified representation of such a broadcast network 100 is illustrated in FIG. 1B. In the broadcast network 100, a broadcast center 102 provides a common signal via a wired or wireless communication link 104 to each of a plurality of geographically dispersed transmitters 134a-134f. Each of the transmitters 134a-134f broadcasts the same signal 136, although the transmission from each transmitter 134a-134f may be delayed by an amount programmed into the transmitters by the broadcaster. Mobile receiver devices 150 may be located anywhere within the broadcast coverage area and frequently will be moving, such as when used within a vehicle.

With multiple transmitters 134a-134f broadcasting the same signal, a receiver device 150 will typically receive the same direct signal 136 from multiple transmitters, depending upon its location within the coverage area. In addition to receiving multiple direct broadcast transmissions, receiver devices 150 will also receive delayed signals that arrive via reflections off of mountains and buildings, which are referred to as multipath signals 138. Due to the different distances between a receiver device 150 and the various transmitters 134a-134f, as well as the extra path length of multipath signals 138, receiver devices 150 will receive the broadcast with a range of offset times, which is sometimes referred to as the "delay spread." A key technical challenge for the receiver devices is to receive and decode the broadcast signal in the presence of multiple versions of the signal arriving at slightly different times, which can lead to destructive interference ("fading").

Many mobile broadcast system broadcast signals in orthogonal frequency domain multiplex (OFDM) format. OFDM is a multi-carrier modulation technique that effectively partitions the overall system bandwidth into multiple (N) sub-carriers. These sub-carriers, which are also referred to as tones, bins, frequency channels, etc., are spaced apart at precise frequencies to provide orthogonality. Content may be modulated onto the sub-carriers by adjusting each sub-carrier's phase, amplitude or both. Typically, quadrature phase shift keying (QPSK) or quadrature amplitude modulation (QAM) is used, but other modulation schemes may also be used.

In order to permit receiver devices to synchronize with the broadcast signal, OFDM signal typically include a number of different pilot signals. Pilot signals are signals of known frequency, timing, duration, and data pattern format that receiver devices can recognize and use to align their decoding circuits to the symbols within the signal.

Figure 2A:
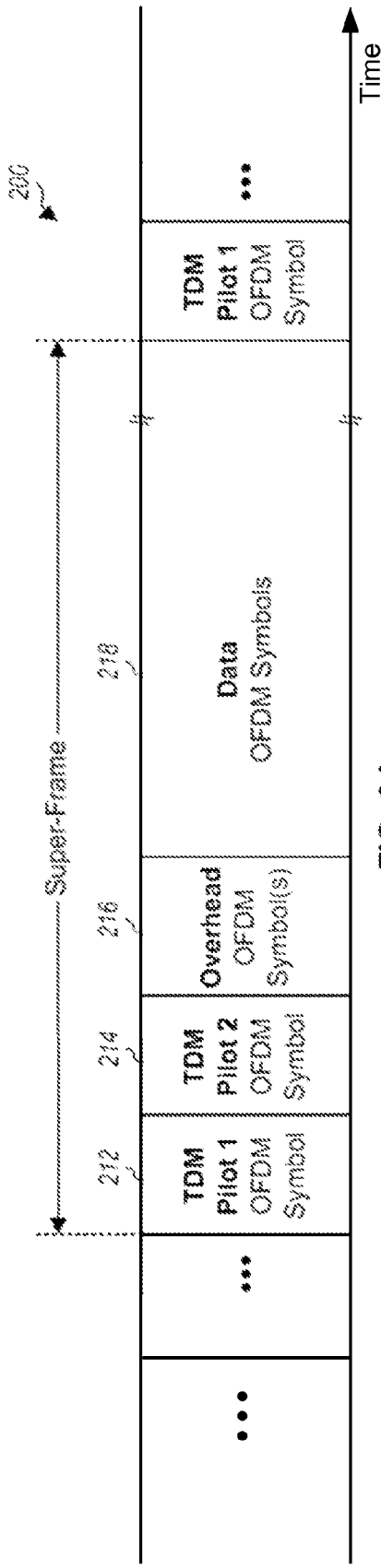
FIGS. 2A and 2B are diagrams of example super-frame structures for an OFDM communication system.

FIG. 2A illustrates a diagram of a super-frame structure 200 that may be used in an OFDM broadcast system 100. Data and pilots may be transmitted in frames or super-frames, with each frame or super-frame having a predetermined time duration. A super-frame may also be referred to as a frame, a time slot, or some other terminology. In the illustrated embodiment, each super-frame includes a TDM pilot 1 field 212 for a first TDM pilot, a TDM pilot 2 field 214 for a second TDM pilot, an overhead field 216 for overhead/control data, and a data field 218 for traffic/packet data.

The four fields 212 through 218 are time division multiplexed in each super-frame such that only one field is transmitted at any given moment. The four fields may also be arranged in the order shown in FIG. 2A to facilitate synchronization and data recovery. Pilot OFDM symbols in pilot fields 212 and 214, which are transmitted first in each super-frame, may be used for detection of overhead OFDM symbols in field 216, which is transmitted next in the super-frame. Overhead information obtained from field 216 may then be used for recovery of traffic/packet data sent in data field 218, which is transmitted last in the super-frame.

In an embodiment, TDM pilot 1 field 212 carries one OFDM symbol for TDM pilot 1, and TDM pilot 2 field 214 also carries one OFDM symbol for TDM pilot 2. In general, each field may be of any duration, and the fields may be arranged in any order. TDM pilots 1 and 2 are broadcast periodically in each frame to facilitate synchronization by the wireless receivers. Overhead field 216 and/or data field 218 may also contain pilot symbols that are frequency division multiplexed with data symbols, as described below.

Figure 2B:
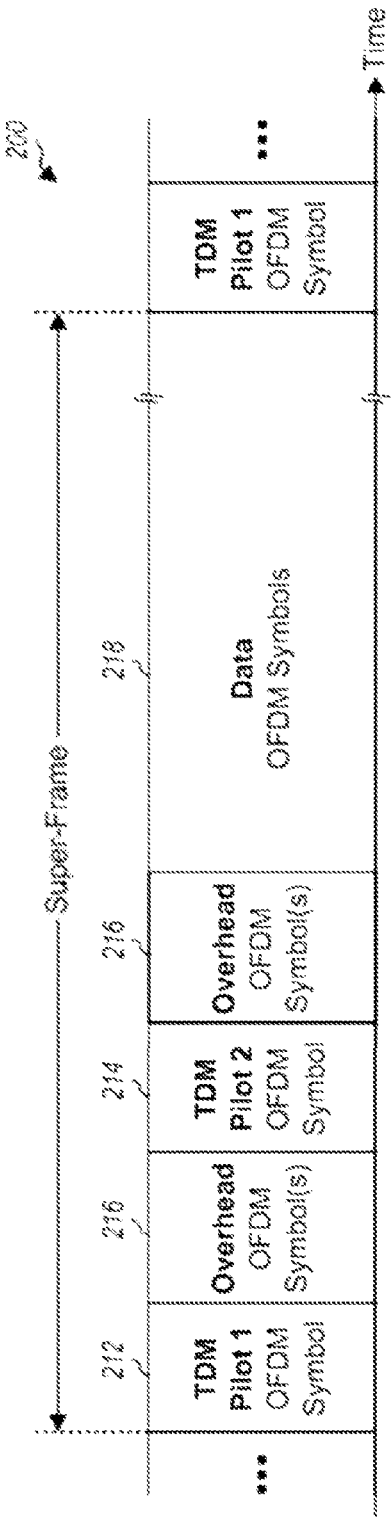

FIG. 2B illustrates a diagram of another embodiment of a super-frame structure 200 that may be used for an OFDM system 100. This embodiment follows TDM pilot 1 symbol 212 with TDM pilot 2 symbol 214, with overhead OFDM symbols 216 added in-between. The number and duration of overhead symbols are known such that synchronization to the TDM pilot 1 symbol 212 allows estimating where the TDM pilot 2 symbol 214 will begin.

TDM pilots 1 and 2 may be designed to facilitate synchronization by the wireless receivers in the system. For example, wireless receiver may use the TDM pilot 1 to detect the start of each frame, obtain a coarse estimate of symbol timing, and estimate frequency error. The wireless receiver may use TDM pilot 2 to obtain more accurate symbol timing.

In a broadcast communication system that provides signal(s) for positioning and transmitter identification, such as the PPC signals in MediaFLO® broadcast systems, the receiving device can, in general, identify all the significant signal arrivals individually. The structure of the PPC positioning waveform is intentionally designed in MediaFLO® broadcast systems to enable receiver devices to identify individual transmitters and their respective ranging at distances that significantly exceed the useful data communications path. For example data communications typically requires a C/N of 10 dB, but ranging and transmitter identification might be accomplished using the PPC signals at −10 dB C/N.

Figure 3:
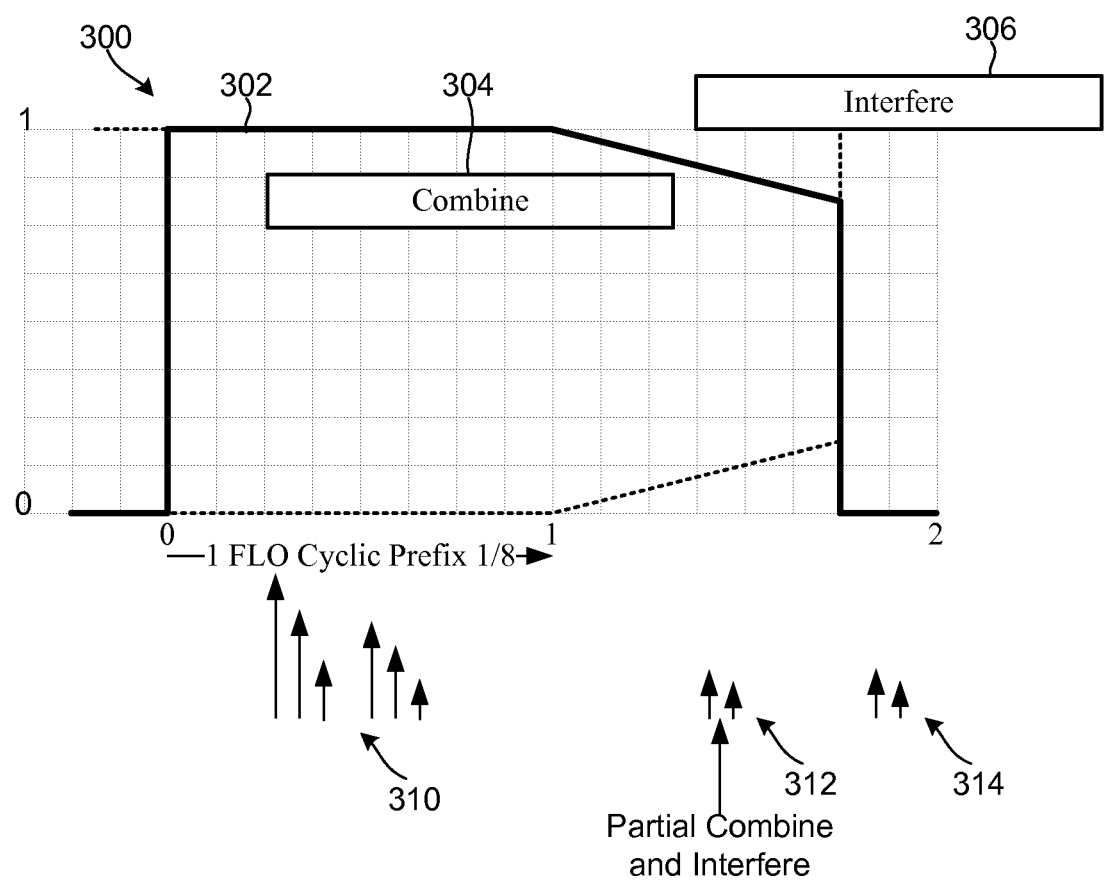
FIG. 3 is a diagram of signal combining characteristics in a multi-transmitter broadcast system.

Since signals arriving at nearly the same time from different transmitters in a multi-transmitter communication system (e.g., in MediaFLO® broadcast system) will be in phase, such signals will tend to combine and thus reinforce each other. However, signals arriving some time after the first arriving signals will be out of phase, and thus will tend to interfere with the early arriving signals. Such basic wave interactions occur within the receiver devices in a manner that depends upon the radio frequency characteristics of the receiver device. The combining characteristics depend upon the electronic and signal processing characteristics of the receiver device, such as signal processing delays, antenna characteristics, etc. Thus, receiver devices will exhibit time-delay signal combining characteristics 300 like those illustrated in FIG. 3. For example, broadcast signals 310 that arrive within a combining duration 304 will tend to reinforce each other, resulting in a maximized signal level 302. However, signals 312 arriving a little bit later may partially combine and partially interfere with the earlier arriving signals, resulting in a degradation in the signal level 302. Signal 314 arriving during an interference duration 306 will tend to interfere with the earlier arriving signals, causing a drop in the signal level 302.

The various embodiments make use of both the ability to generate an alias-free long channel model based upon broadcast signals such as the MediaFLO® PPC signal, and the receiver device ability to know its own combining characteristics. With these two sets of data, receiver devices may be configured to identify multiple potential sampling window positions (referred to herein as "hypotheticals") based upon the long channel model and significant signals received within a short sampling window. Using the receiver device's combining characteristics and the relative timing information provided from the long channel model, receiver devices in the various embodiments may evaluate the various hypothetical positions for the combining window by estimating their respective SINR values. By comparing the estimated SINR value for each of a plurality of sampling window positions, the receiver device can identify a sampling window position with the best SINR results. In this manner, an accurate sampling window position can be determined using all of the information available to the receiver device. In some cases, the time required to determine the path distance to each transmitter may be long compared to other window position estimation methods (e.g., heuristic methods), so the sampling time window positioning method of the various embodiments may be combined with or used in conjunction with other window positioning methods. In a further embodiment, the signals that may become important may be identified before they become significant.

There are events that may cause a movement of the timing window position unrelated to the current long channel estimate. This is typified by a shadowed/unshadowed event. FIGS. 4A-4D illustrates an example of how shadowed and unshadowed events can impact the signal received within the short sampling window.

Referring to FIG. 4A, a receiver device may be able to receive signals from two transmitters, namely transmitter A (signal 402) and transmitter B (signal 412), including multipath versions of these broadcast signals (signals 404, 406, 414 and 416). In the circumstances illustrated in FIG. 4A, signals from transmitter A are unshadowed, and thus received in full amplitude, while signals from transmitter B are shadowed (e.g., by a hill or valley), and thus are received at lower amplitude. As the receiver device travels, the shadowing conditions may change rapidly, such as when a receiver device in an automobile drives over a hill or out of a valley. This is illustrated in FIG. 4B which shows a second shadowing condition in which the primary and multipath signals from transmitter A 402, 404, 406 are shadowed, and thus are received at lower amplitude, while the primary and multipath signals from transmitter B 412, 414, 416 are unshadowed, and thus are received at higher amplitude.

FIGS. 4A and 4B also illustrate how in a long channel model the individual received signals may remain distinguishable in time because the time window is long enough so that aliasing is not occur. The response of the receiver device in the short sampling window may be very different, however, as illustrated in FIGS. 4C and 4D. For example, in the situation illustrated in FIG. 4C, the short timing window 420 may be positioned so that it encompasses the primary and multipath signals of transmitter A 402, 404, 406. So positioned, the sampling window may detect the primary signal 412 of transmitter B in a proper timing position, but detect the later arriving multipath signals 414, 416 as early arriving aliases. The impact of a sudden change in shadowing conditions as illustrated in FIG. 4D which corresponds to the circumstance illustrated in FIG. 4B. When a sudden shift in transmitter shadowing occurs, the timing of the strongest signal may change suddenly. This may cause a repositioning of the short sampling window in time from its previous position 420 to a new position 422. As a result, portions of the transmitter A signal (e.g., signals 402 and 404) may appear as alias signals wrapping around to appear later in the sampling window. Such behavior may lead to degraded SINR.

While the long channel estimate illustrated in FIGS. 4A and 4B can resolve all of the arriving signals, the long channel estimate may not update fast enough to provide temporally accurate levels. This may be the case, particularly when receiver devices are in rapidly moving automobiles which may lead to rapidly changing shadowing conditions. The short sampling channel estimate typically contains better correlated levels (in time) and aliases that may be resolved by their respective time positions. A change in levels in the short sampling channel estimate may drive the window location re-analysis and potential shift in window location as illustrated in FIG. 4D.

In order to enable receiver devices to build an accurate long channel model using PPC signals, receiver devices need to be able to accommodate the broadcast delays that are imposed for particular transmitters by the broadcast network. Such transmission delays can improve overall broadcast coverage performance by reducing the incidence of destructive interference between two transmitters. Such timing delays can be adjusted by broadcasters based upon detailed studies of their networks and the geographic distribution of their customers. While such timing delays may improve the signals received in many receiver devices, the delays can mean that the time of arrival of a signal is not solely due to the distance between the transmitter and the receiver. In order to enable receiver devices to accurately develop a long channel model identifying individual transmitters, such transmission delays should be accounted for. In a first embodiment, the PPC signals may all be broadcast according to the system time (e.g., at the same instant within a super-frame), regardless of the broadcast delay imposed on data signals. In a second embodiment, the broadcast network may broadcast a table of information which lists the broadcast delays of individual transmitters, enabling receiver devices to add or subtract the broadcast delay to determine the transmission delay. This data table may be transmitted as part of the PPC signal or as another overhead data signal.

The various embodiments involve a number of processes that may be implemented in receiver devices. Receiver devices can be configured to construct a very long channel model based on PPC signals or other pilot structures present in the transmission signal. Receiver devices may further be configured to correct for each transmitter's broadcast time offset so that PPC signals may be properly correlated with transmitted data signals and other pilots to enable the device to accurately determine the distance or signal arrival timing in broadcast networks utilizing broadcast time offset. This capability may be supported by broadcasting a list of system transmitter time offsets and locations, which may be sent as a table or other data structure when the PPC signal is sent with other than a zero system time offset. Alternatively, receiver devices may be configured to correct for an entire transmitter signal offset relative to system time when the PPC signals are subject to be transmitter time offset, with this technique supported by PPC offset and transmitter time and positions data broadcast as a table or other data structure.

The various embodiments also provide methods and circuits for calculating the sampling window position which is expected to exhibit a maximum SINR using the information within the long channel model. The SINR may be estimated as a ratio of combining carriers to interfering carriers plus noise that will occur within a particular sampling window position antithetical based upon the timing position information within the long channel model. To support this analysis, receiver devices may identify the signals that will alias in each hypothetical sampling window position based upon the time position information of signals in the long channel model.

To determine when the various methods to be applied, receiver devices may be configured to detect apparent or potential timing change by detecting a level change in the channel. Receiver devices may also be configured to recalculate the best SINR location.

In a further application of the various embodiments, receiver devices may be configured to test a current sampling window position by moving the sampling window in small increments, and comparing predicted impacts on the visible and aliased signals to the measured signals in the new sampling window position. The predicted impacts on the visible and aliased signals may be accomplished described above using the time position information in the long channel. If the predicted impacts approximately match the measured signal in the repositioned sampling window, this may validate the long channel model, and thus the position of the short sampling window determined based upon the calculated best SINR. In other words, comparing the predicted to measured signal impacts of moving the sampling window can validate the hypothesis used in positioning the sampling window based upon the calculated best SINR. However, if the predicted impacts differ significantly from the measured signal in the repositioned sampling window, this may indicate that the long channel model may not reflect current reality, and thus should not be used for positioning the sampling window until it is further refined by the reception of additional PPC (or similar) signals. Such a failed hypothesis may indicate that a different method for positioning the window should be use, such as using heuristic window positioning methods, trying the next reasonable looking window location solution, selecting a solution hypothetical that is exhibiting improving SINR improvement, etc., until the long channel model can be refined. Such a situation may occur when a new transmitter appears that was not previously detected and identified in the process of building a long channel model. This could occur, for example, when a transmitter that has been completely shadowed for a long period is suddenly unshadowed, such as when the receiver device moves to a new location.

While the various embodiments are described with reference to a short sampling window and a long channel model, more than two windows may be used in various implementations. For example, the receiver device may use long and very long channel models in broadcast systems with more than two time estimate methods. The use of multiple window models may provide performance advantages, since the time to generate a long channel model will be related to the length of the long channel model. An implementation using a medium channel model and a long channel model may be more responsive to changes, if the medium channel model can be updated quickly. Thus, in a three window implementation, a medium channel model may be used to reposition the sampling window in response to sudden changes in the channel response, while the long channel model is used over longer time cycles to validate the hypotheses used in generating and positioning the medium channel model and positioning the short sampling window.

In a further embodiment, in the case of multiple potential channel estimation windows, the receiver devices may calculate a signal sampling window position hypothesis for each of the short and medium channel estimate and choose the best SINR from among the short and medium channel estimates by comparing the SINR values for both medium and short channel window positions to select the most favorable. The receiver devices may further determine their Doppler shift condition. In high Doppler shift conditions the device may increase the medium window SINR requirement, and as a consequence select short instead. In this embodiment, the receiver device can estimate or predict the Doppler shift from the measured rate of channel decorrelation. Receiver devices will typically understand their own Doppler performance characteristics.

In a further embodiment, receiver devices may be configured to use the long channel model in combination with terrain data (e.g., in a terrain database for the broadcast coverage area) and position information (e.g., determined by a GPS receiver or from triangulation using the PPC signals) to predict or confirm shadowed and unshadowed conditions and events as they occur. Thus, by knowing where the receiver device is within the broadcast coverage area terrain and the distance to or relative timing of signals from the various transmitters, receiver devices can anticipate or confirm a change in signal level for particular transmitters based upon whether their signals should be shadowed or unshadowed. When the receiver device detects that the device is moving (e.g., in an automobile as may be detected based upon the rate of change in position is measured by a GPS receiver or sequential triangulation calculations based on PPC signals), the receiver device may be configured to anticipate when shadowing events may occur in order to predict a minimum safe time guard ahead of the first known arrival signal. In this embodiment the rate of change in macro shadowing may be presumed to depend on the device's velocity.

Figure 5:
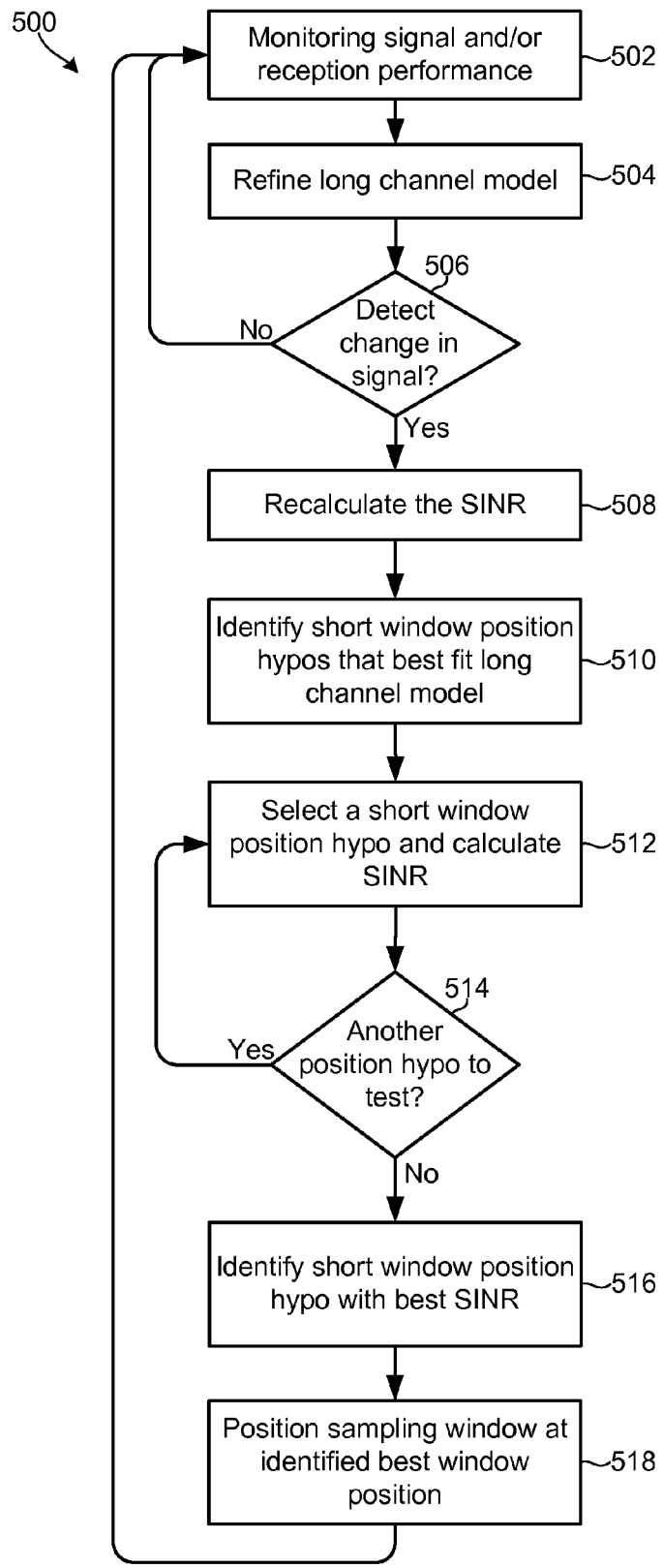
FIG. 5 is a process flow diagram of an embodiment method for positioning a wireless signal sampling window based upon a long channel model.

FIG. 5 illustrates an embodiment method 500 by which a receiver circuit or digital signal processor within a receiver device may position a short sampling window based upon a long channel model. In step 502, during normal reception operation, a receiver circuit or digital signal processor within the receiver device may monitor the received signal and/or the reception performance, such as by monitoring the signal-to-noise ratio, SINR, received packet error rate, frequency of error correction processing, or other performance measure that may allow the receiver device to detect a change in the received signal. Also as part of normal operations, the receiver device may develop and regularly refine a long channel model in step 504, such as by monitoring the PPC signal in a MediaFLO® technology broadcast network. Generating a long channel model in step 504 involves unwrapping the received signals present in the short sampling window into a long alias-free window using a long channel signal, such as the PPC signal contained within MediaFLO® broadcast transmissions. For example, by receiving the PPC signal from each transmitter, the receiver device can determine the signal reception time and/or distance from each transmitter to the device, and then match each received signal to its respective transmitter, as illustrated in FIG. 4A.

This monitoring of the signal or reception performance in step 502 and refining of the long channel model in step 504 may continue so long as a receiver circuit or digital signal processor within the receiver device does not detect a significant change in the signal and determination step 506. When the receiver circuit or digital signal processor within the receiver device detects a change in the received signal or reception performance (i.e., determination step 506="Yes"), it may recalculate the SINR in step 508. In step 510, the receiver circuit or digital signal processor within the receiver device may use the generated long channel model to identify hypothetical short window positions within the long channel model that best fit the relative timing and power level of signals received in the short sampling window. In some cases, only a single hypothetical window position may be developed, but in many circumstances, the relative timing of the signals within the sampling window may match (within error limits) a number of hypothetical positions. These identified window position hypotheticals may then be tested in steps 512, 514. Specifically, the receiver circuit or digital signal processor within the receiver device may select a particular short window position of hypothetical in step 512 and use that hypothetical to calculate the resulting SINR knowing the relative timing of signals received from the transmitters and the characteristics of the receiver device. To estimate the SINR for a particular hypothetical sampling window position, the receiver circuit or digital signal processor within the receiver device may identify signals which will alias in that window position based upon the time position information of signals in the long channel model, and then estimate the SINR as a ratio of the combining carriers to interfering carriers (based upon the device's combining characteristics) plus the channel noise.

In determination step 514, the device may determine whether there is another position hypothetical to test, and continue selecting and determining the SINR for position hypotheticals until all have been tested. Once all short window position hypotheticals have been tested (i.e., determination step 514="No"), the receiver circuit or digital signal processor within the receiver device may identify the short window position hypothetical which has the best calculated SINR in step 516. Since the SINR estimate is calculated based upon an alias-free channel model, that position hypothetical with the best SINR should best match the current reception circumstances, though in step 518, the receiver circuit or digital signal processor may position the sampling window at the identified best window position. With the sampling window repositioning, the receiver circuit or digital signal processor within the receiver device may return to monitoring the signal and/or reception performance by returning to step 502.

Figure 6:
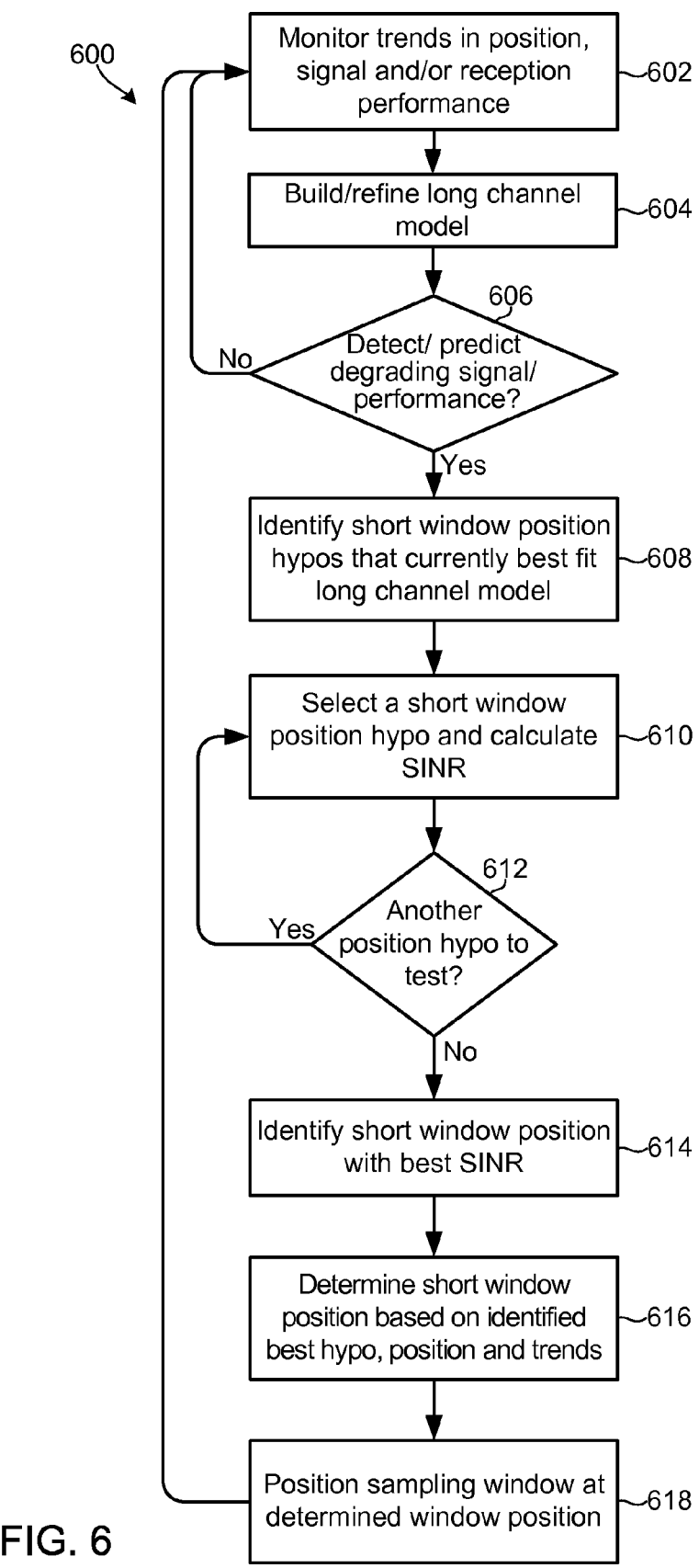
FIG. 6 is a process flow diagram of another embodiment method for positioning a wireless signal sampling window based upon a long channel model.

FIG. 6 illustrates an embodiment method 600 which builds upon the capabilities enabled by a long channel model by taking into account trend and/or position information that may be known to the receiver device. At step 602, a receiver circuit or digital signal processor within the receiver device may monitor trends in the received signal and/or the reception performance, such as by monitoring the signal-to-noise ratio, SINR, received packet error rate, frequency of error correction processing, or other performance measure that may allow the receiver device to detect a change in the received signal. Also as part of normal operations, the receiver device may develop and continuously refine a long channel model in step 604, such as by monitoring the PPC signal in a MediaFLO® technology broadcast network on an ongoing basis.

In determination step 606, the receiver circuit or digital signal processor within the receiver device may monitor trends in the position of the device, the received signal, and/or the reception performance. For example, by monitoring trends in the device position, the receiver circuit or digital signal processor may determine the speed and location of the device within the coverage area. Further, by monitoring trends in the single and/or reception performance, the receiver device may be able to anticipate when a current window position may need to be adjusted to reflect a change position of the device or improve the SINR. For example, when a receiver device is moving, such as in an automobile, it may travel away from one transmitter and in the general direction of another, such that over time, the closest transmitter will change. By monitoring the velocity or trends of the received signal, the receiver circuit or digital signal processor within the receiver device may be configured to predict or anticipate that the window position should be adjusted in the near future viewed before the reception performance has degraded to a threshold level. As long as the signal or reception performance is not detected or predicted to degrade below an acceptable level (i.e., determination step 606="No"), the receiver circuit or digital signal processor may continue to monitor trends in position, signal and/or deception performance in step 602 and refine the long channel model in step 604.

When the receiver circuit or digital signal processor detects or predicts that the signal or reception performance is degrading sufficient to require an adjustment to the window position (i.e., determination step 606="Yes"), the receiver circuit or digital signal processor may identify short window position hypotheticals that currently best fit the long channel model in step 608. In step 610 and determination step 612, the receiver circuit or digital signal processor may test each of the identified short window position hypotheticals by selecting a hypothetical and using that window position in combination with the long channel model to calculate its SINR.

Once all window position hypotheticals have been tested (i.e., determination step 612="No"), in step 614 the receiver circuit or digital signal processor may identify the short window position with the best SINR. In step 616 the receiver circuit or digital signal processor may use the SINR results in combination with the position and signal trend information gathered by the receiver circuit or digital signal processor in step 602 to determine a short window position that will be best in the current circumstances. For example, if device position trends (i.e., speed and direction of travel) and/or signal trends indicate that the device is moving away from one transmitter towards another or that the reception performance of the current window position is degrading, the receiver circuit or digital signal processor may select a sampling window position that is not currently optimal but is expected to improve over time. Thus, in step 614, the receiver circuit or digital signal processor may select a sampling window position with a calculated SINR that is not presently highest if trends indicate it may soon be highest. Alternatively, in step 616, the receiver circuit or digital signal processor may select a sampling window position that is based on the hypothetical sampling window position having a highest calculated SINR but adjusted with a time guard or time offset that will accommodate a change in the closest signal source. For example, if receiver device determines from trends in the device position or the long channel model that a transmitter signal will soon become significant, the device may set the sampling window position sufficiently ahead of the currently first arriving signal so that the soon to become significant signal will be detected without aliasing. The selection of a sampling window position based upon the detected trends in position, signal strength, etc., may be accomplished in a variety of ways. In one embodiment, the processes of evaluating the short window position hypotheticals and calculating their respective SINR values may be repeated periodically (e.g., once a second or once every five seconds) so that trends in calculated SINR values may be tracked and used in step 616 to select the window position with satisfactory and improving performance. Once a short window position is determined at step 616, the sampling window may be positioned at the determined position in step 618, after which normal operations may proceed by returning to step 602.

In a further embodiment, information regarding the terrain (e.g., hills, valleys and structures) within the coverage area may be used in step 616 to determine a best short window position based upon the long channel model and current position. In this embodiment, the receiver circuit or digital signal processor may compare a determined current position of the receiver device to a topographic or terrain map database to identify geographic features (e.g., a dip or valley or intervening hill) that may impact signal reception from particular transmitters, and use that information in combination with determined receiver device speed and direction to anticipate reception degradation that may occur for particular transmitters. For example, if the monitored trends in position, signal strength and/or reception performance obtained in step 602 indicate that a current window position is degrading, and the device position compared to the terrain map database indicates that the cause of the degradation may be shadowing of the closest transmitters, the receiver circuit or digital signal processor may determine in step 616 that the best short window position is one with a lower SINR that is unlikely to experience shadowing degradation. Thus, in step 616, the receiver circuit or digital signal processor may select a window position which is optimal for a more distant transmitter when a closest transmitter is anticipated to be shadowed or partially blocked by a geographic feature. As another example, if the device position trends compared to the terrain map database indicates that the receiver device will soon be shadowed from a first arriving signal source, the receiver circuit or digital signal processor may prepare for the anticipated shadowing event by evaluating sampling window position hypotheticals to identify one with a best SINR when the current first arriving signal is no longer received. The receiver circuit or digital signal processor may then monitor the received signal or receiver performance to detect the first signs of shadowing, and promptly reposition the sampling window to the identified hypothetical.

In a further embodiment, receiver devices may be configured to log sampling window position hypothetical solutions that work in particular locations in conjunction with the location data. Receiver devices may further be configured to download such a log of solutions versus location to a central location (e.g., the broadcast network). Such log downloads might be accomplished in conjunction with other device data downloads via the unicast network, such as logs of user program viewing statistics. Downloading such location versus window location information may be very useful to network managers as they work to optimize the performance of their networks. By providing data on window positions that worked and did not work in various coverage area locations, network operators may be able to refine broadcast tower locations and broadcast offsets. Also, data and terrain files may be downloaded to receiver devices so they can be informed of particular window location preferences that yield better reception performance in particular locations, so that they may be better able to maintain continuity of reception when moving (e.g., in an automobile).

Figure 7:
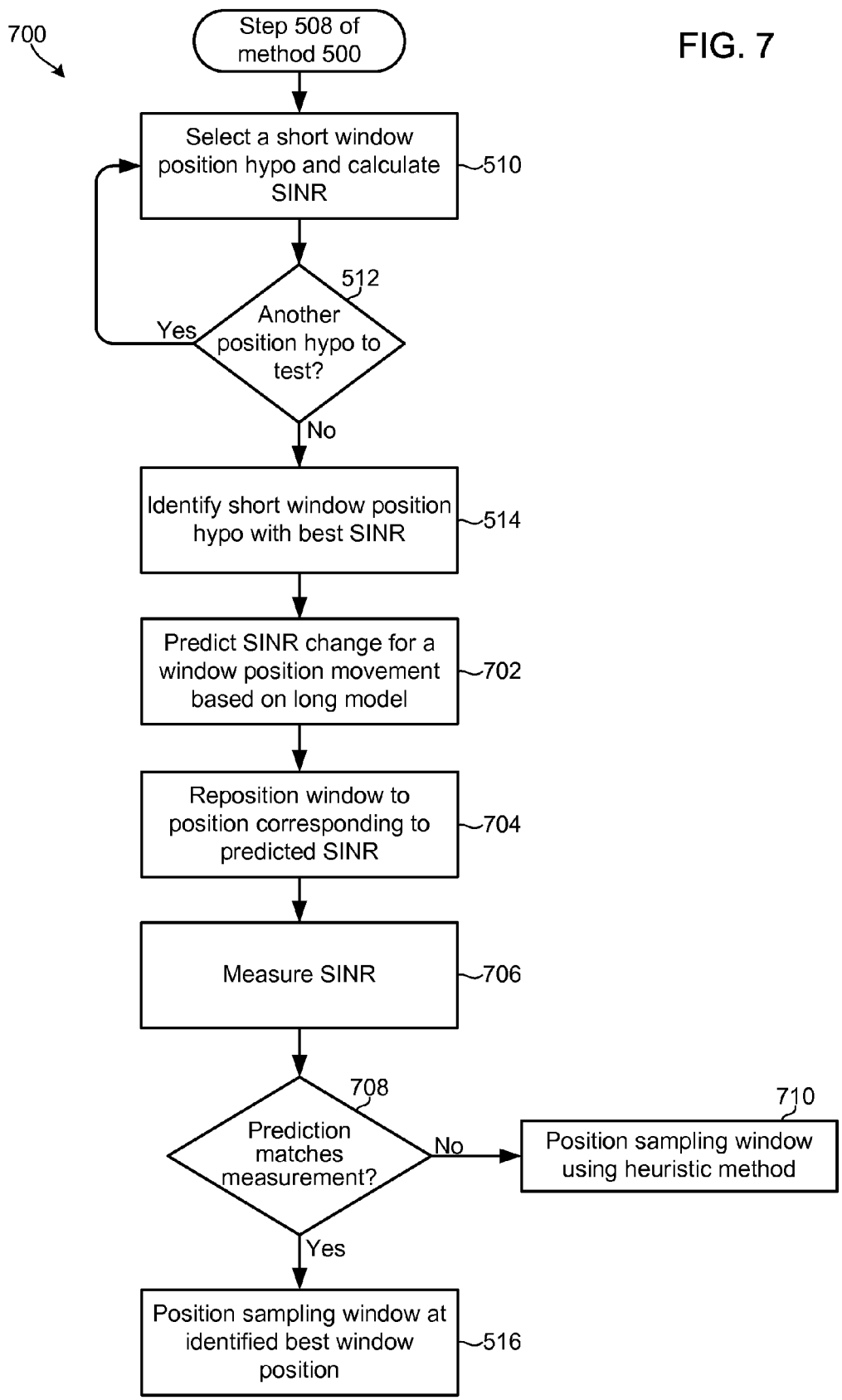
FIG. 7 is a process flow diagram of an embodiment method for testing a long channel model for errors, such as may occur when different broadcast signals arrive simultaneously.

FIG. 7 illustrates a further embodiment method 700 which may be implemented in a receiver circuit or digital signal processor of a receiver device to address the situation which may occasionally occur when two transmitters are positioned equal distance from a receiver device. In such circumstances, the broadcast signals may arrive simultaneously at the receiver device, and thus may not be distinguishable in time in the short sampling window. In such circumstances, the long channel model may have determined the identities of the transmitters based upon the PPC signals which, being transmitted in a round-robin fashion, do not arrive simultaneously. However, the determined location of the transmitters could not be confirmed based upon the short sampling window results. To resolve the ambiguity, method 700 may be used to predict the SINR that will result by moving the short sampling window, with that result compared to the measured SINR to confirm the long channel model.

Method 700 may implement steps 502 through 508 of method 500 described above with reference to FIG. 5. As described above, the receiver circuit or digital signal processor may test short window position hypotheticals to identify the window position with the best calculated SINR in steps 510 through 514. In step 702, the receiver circuit or digital signal processor may use the long channel model to predict the SINR or change in SINR that will result when the window position is moved a certain amount. In step 704, the receiver circuit or digital signal processor may move the reposition the short sampling window to the position used to predict the SINR or change in SINR in step 702. In step 706, the receiver circuit or digital signal processor may measure the actual SINR, and determine whether the measurement matches the production and determination step 708. If the measurement matches the production (i.e., determination step 708="Yes"), the receiver circuit or digital signal processor may position the sampling window at the identified best window position in step 516, with operations preceding as described above with reference to FIG. 5. However, if the predicted SINR or SINR change does not match the measured SINR (i.e., determination step 708="No"), this may indicate that the long channel model may be temporarily out of date, in which case the receiver circuit or digital signal processor may reposition the sampling window using conventional heuristic methods (e.g., based on the time of the strongest receive signal minus a guard time, upon the next best solution, or a position hypothetical that is exhibiting improving SINR performance) in step 710. Over time, the long channel model can correct as the PPC signals are regularly received and the long channel model is refined. Operations may proceed as described using method 500 or 600 as described above. The long channel model should quickly be refined, such as by monitoring the PPC signals over the next 16 seconds to identify the distances to (or transmission delays of) each transmitter in the broadcast coverage area.

Figure 8:
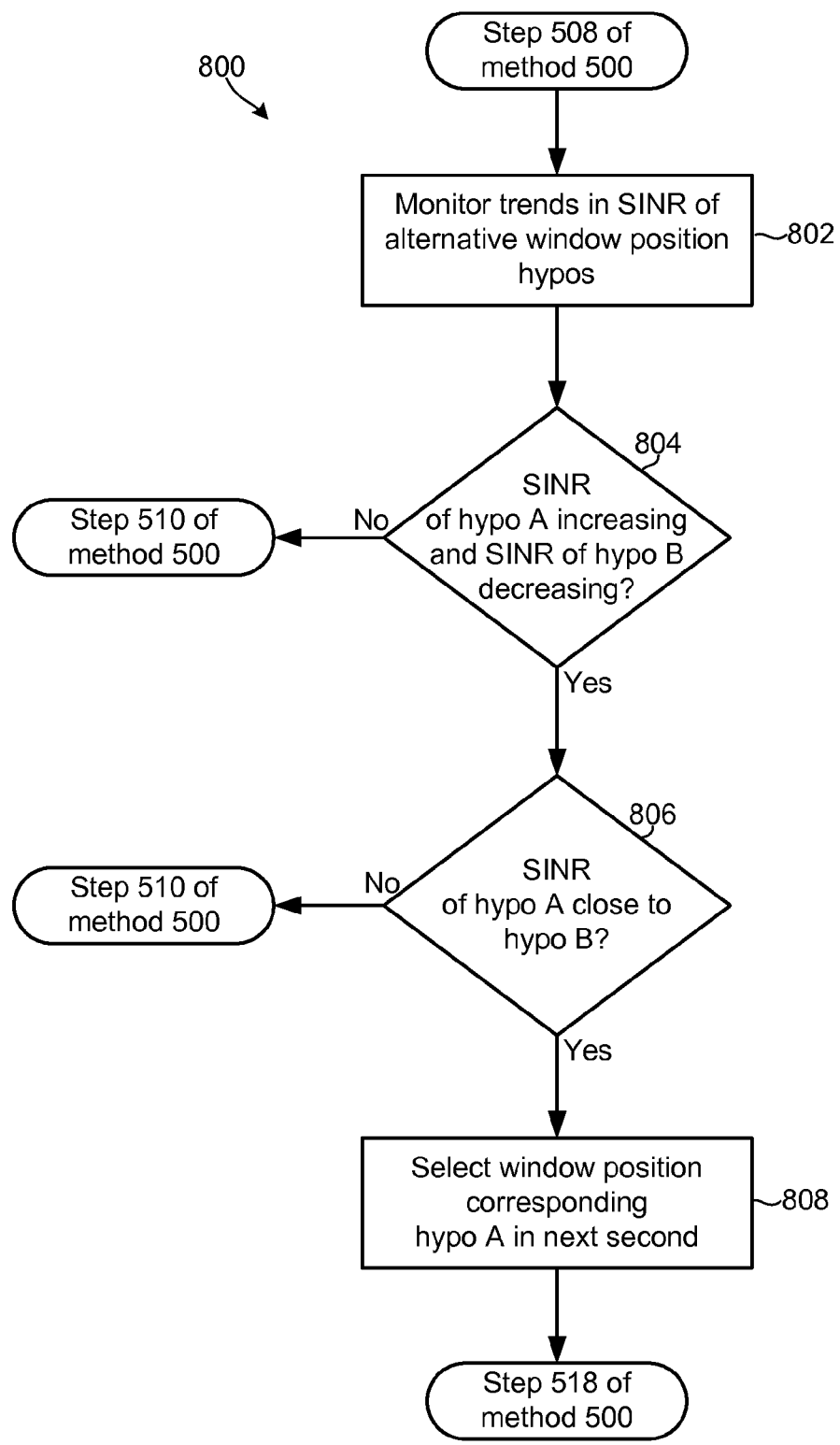
FIG. 8 is a process flow diagram of an embodiment method for selecting as signal sampling window position based upon trends in estimated SINR.

In a further embodiment, receiver devices may compare trends in the SINR between two alternative window position hypotheses, and switch tone hypotheses based upon such trends when the trends indicate that a change in best window position solution is about to occur. The SINR is a calculation of an SINR estimate based on a current window position and the decomposed signal levels. In this usage the long channel model allows the device to assign specific arrivals to a transmitter, and hence calculate whether the energy is signal or interference. Each hypothesis has an SINR. Each time that the device decodes it gets a new set of arrivals and levels. The device can calculate the SINR for each hypothesis. The device can observe the trend of SINR for each hypothesis. For example SINR for hypothesis A can increase and SINR for hypothesis B (current winner) can decline. If A is close to B, and increasing relative to B, the device may chose to switch to A for the next second, especially if B is already a successful SINR, or is projected to be successful, or A is projected to be unsuccessful or A is projected to better than B. An example method 800 may be used with this embodiment is illustrated FIG. 8. Method 800 may be implemented in conjunction with the embodiment methods described above with reference to FIG. 5. For example, once an SINR is calculated in step 508 of method 500, the receiver device may use the SINR values at step 802 of method 800 to monitor trends in the SINR of alternative window position hypotheticals. In determination step 804, the receiver device may determine whether the monitored trends in SINR values for various hypotheses indicates that one (or more) of the window position hypotheses (e.g., hypo A) is exhibiting improving SINR values while the current window position hypothesis (i.e., hypo B) is exhibiting decreasing SINR values. If this condition is not met (i.e., determination step 804="No"), the receiver device may continue with method 500 by proceeding to step 510. However, if this condition is detected (i.e., determination step 804="Yes"), the receiver device may further determine whether the SINR value of hypo A is close to or approaching that of hypo B. If this condition is not met (i.e., determination step 806="No"), the receiver device may continue with method 500 by proceeding to step 510. However, if this condition is detected (i.e., determination step 806="Yes"), the receiver device may select the signal sampling position of the increasing hypothetical (i.e., hypo A) for implementation in the next second, anticipating that it will soon be the optimum window position even before a comparison of SINR values indicates it is best. Thereafter, the receiver device may proceed to reposition the window, such as by continuing with step 518 using the selected window position.

The various embodiments provide a number of performance advantages enabled by the use of long duration pilot signals, such as the PPC signals in MediaFLO® broadcast systems, to generate a long channel model. The embodiments can enable receiver devices to enjoy the performance improvements from having a better sampling window placement. The embodiments may enable receiver devices to avoid potential destructive aliasing conditions. The embodiments may enable receiver devices to eliminate use of some assumptions used in positioning sampling windows, such as the strongest signal is the first arriving signal. The embodiments may enable receiver devices to reduce or eliminate the time guard in the sampling window position to account for new signals popping up, since the long channel model is more sensitive (i.e., the PPC signals can be received at greater distances than data signals) enabling "candidates" signals to be identified before they are significant. The embodiments may enable receiver devices to reduce or eliminate potential SINR degradation due to so called forward wrap-around. The embodiments may enable receiver devices to position the sampling window based on the maximum achievable SINR given the receiver's characteristics.

Figure 9:
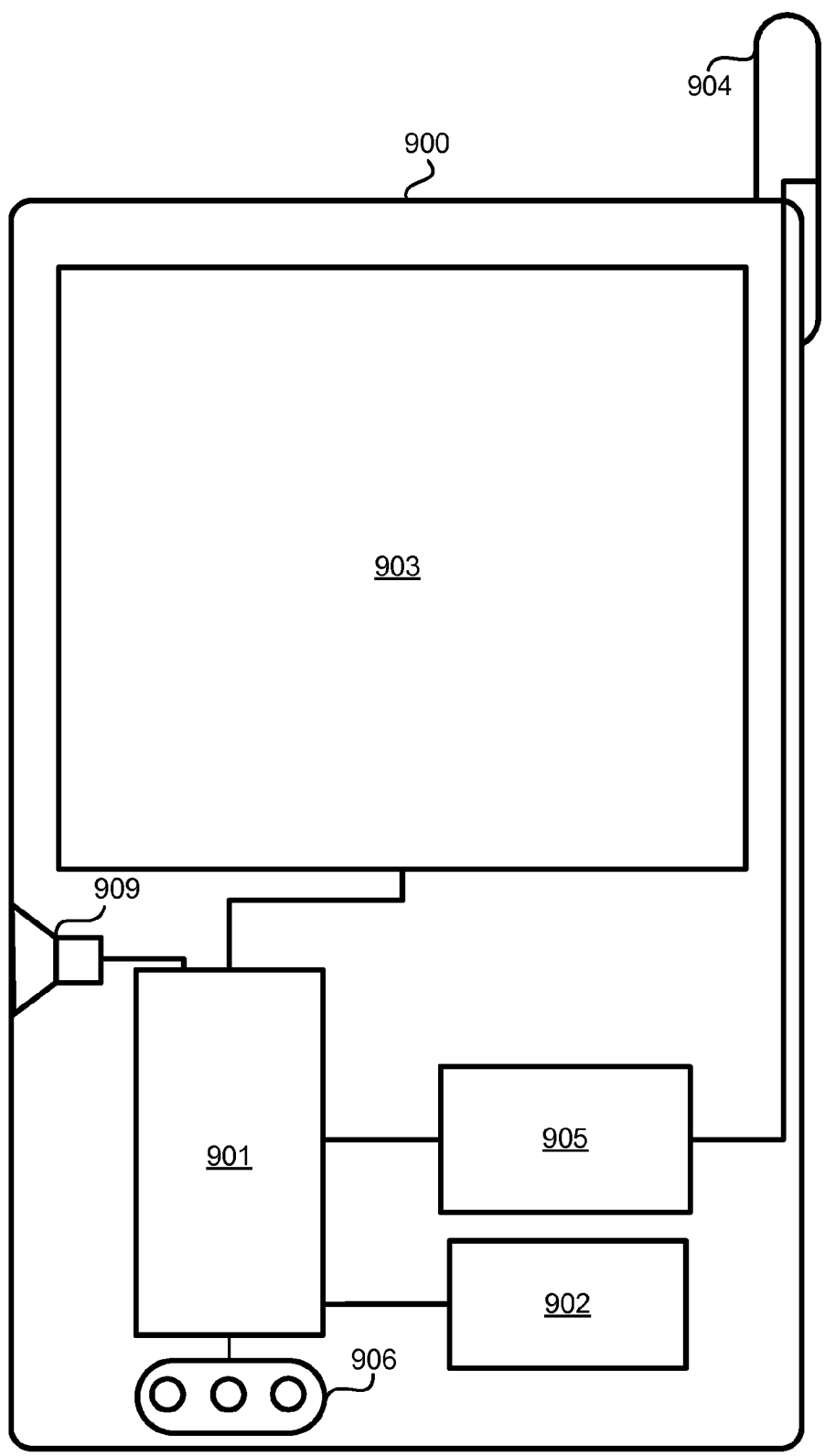
FIG. 9 is a component block diagram of a mobile device suitable for use in an embodiment.

Typical wireless receivers 900 suitable for use with the various embodiments will have in common the components illustrated in FIG. 9. For example, an exemplary wireless receiver 900 may include a processor 901 coupled to internal memory 902, a display 903, such as a touchscreen display, and to a speaker 909. Additionally, the wireless receiver 900 may have an antenna 904 for receiving electromagnetic radiation that is connected to a wireless communication receiver circuit 905 coupled to the processor 901. The wireless communication receiver circuit 905 may include an integral processor and/or a digital signal processor (DSP) which may be configured with processor-executable instructions to perform the operations of the various embodiments. Wireless receivers 900 sometimes also include keys 906 and menu selection buttons or rocker switches for receiving user inputs.

The processor 901 may be any programmable microprocessor, microcomputer or multiple processor chip or chips that can be configured by software instructions (applications) to perform a variety of functions, including the functions of the various embodiments described herein. In some mobile devices, multiple processors 901 may be provided, such as one processor dedicated to wireless communication functions and one processor dedicated to running other applications. Also, as mentioned above, the wireless communication receiver circuit 905 may also include a processor and/or DSP that may be software configurable. Typically, software programs for configuring the processor 901 or a processor within the wireless communication receiver circuit 905 may be stored in the internal memory 902, or memory within the processor or receiver circuit 905, before they are accessed and loaded into the processor 901. In some mobile devices, the processor 901 and the wireless communication receiver circuit 905 may include internal memory sufficient to store the configuration software instructions. In many wireless receivers 900, the internal memory 902 may be a volatile or nonvolatile memory, such as flash memory, or a mixture of both. For the purposes of this description, a general reference to memory refers to all memory accessible by the processor 901 or a processor within the wireless communication receiver circuit 905, including internal memory 902, removable memory plugged into the wireless receiver 900, and memory within the processor 901 and/or the wireless communication receiver circuit 905.

The foregoing method descriptions and the process flow diagrams are provided merely as illustrative examples and are not intended to require or imply that the steps of the various embodiments must be performed in the order presented. As will be appreciated by one of skill in the art, the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in hardware, the functionality may be implemented within circuitry of a wireless signal processing circuit that may be suitable for use in a wireless receiver/transceiver or mobile device. Such a wireless signal processing circuit may include circuits for accomplishing the signal measuring and calculating steps described in the various embodiments. If implemented in software, the functions may be stored on as one or more instructions or code on a processor-readable medium. The steps of a method or algorithm disclosed herein may be embodied in a processor-executable software module which may reside on a non-transitory, tangible processor-readable storage medium. A non-transitory, tangible storage media may be any available tangible storage media that may be accessed by a processor or computer. By way of example, and not limitation, such processor-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a processor or computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of processor-readable media. Additionally, the operations of a method or algorithm may reside as one or any combination or set of codes and/or instructions on a machine readable storage medium and/or processor-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of positioning a signal sampling window in a wireless receiver device, comprising:
    generating a first channel model of transmitters within reception range using a transmitted signal that enables determination of a virtually alias-free channel estimate; and
    using the first channel model to position the signal sampling window;
    determining a location of the receiver device; and
    identifying transmitters that are unshadowed by terrain at the location of the receiver device,
    wherein using the first channel model to position the signal sampling window comprises selecting a signal sampling window position based on the first channel model and transmitters which are not shadowed by terrain at the location of the receiver device.

2. The method of claim 1, further comprising continuously refining the first channel model of transmitters based upon ongoing reception of the transmitted signal.

3. The method of claim 1, further comprising calculating a signal to interference and noise ratio (SINR) estimate.

4. The method of claim 1, wherein using the first channel model to position the signal sampling window comprises:
    using the first model to identify one or more signal sampling window position hypotheticals;
    calculating a signal to interference and noise ratio (SINR) for each of the one or more signal sample window position hypotheticals; and
    positioning the signal sampling window at the one or more signal sampling window position hypotheticals having the best calculated SINR.

5. The method of claim 4, wherein the SINR is calculated as the ratio of combining carriers to interfering carriers plus channel noise.

6. The method of claim 5, wherein the calculation of the ratio of combining carriers to interfering carriers is based upon combining characteristics of the wireless receiver device.

7. The method of claim 1, further comprising monitoring trends in positions of the wireless receiver device, wherein using the first channel model to position the signal sampling window comprises:
    using the first channel model to identify one or more signal sampling window position hypotheticals;
    calculating a signal to interference and noise ratio (SINR) for each of the one or more signal sampling window position hypotheticals;
    identifying the one or more signal sample window position hypotheticals having a best SINR; and
    positioning the signal sampling window based upon the identified signal sampling window position hypothetical having a best SINR and the monitored trends in position of the wireless receiver device.

8. The method of claim 1,
    wherein identifying transmitters that are unshadowed comprises
    comparing the location of the receiver device to a terrain database.

9. The method of claim 8, further comprising logging the selected signal sampling window position and the determined location of the receiver device in memory.

10. The method of claim 1, further comprising testing a first signal sampling window position by:
    predicting a signal to interference and noise ratio (SINR) with the signal sampling window in a second position different than the first position;
    repositioning the signal sampling window to the second position;
    measuring the SINR with the signal sampling window in the second position; and
    comparing the predicted SINR to the measured SINR.

11. The method of claim 10, further comprising using a heuristic method for positioning the signal sampling window when the predicted SINR differs significantly from the measured SINR.

12. The method of claim 10, further comprising:
    selecting an alternate signal sampling window hypothesis that has similar predicted performance, but at a different window location when the predicted SINR differs significantly from the measured SINR for the most recent utilized hypothesis.

13. The method of claim 1, wherein:
    the wireless receiver device is configured to receive transmissions from a MediaFLO® broadcast network; and
    generating the first channel model comprises receiving positioning pilot channel (PPC) signals from transmitters in the MediaFLO® broadcast network and using a time of arrival of the PPC signals and known positions of the transmitters.

14. The method of claim 13, wherein generating the first channel model further comprises compensating for transmitter signal timing offsets.

15. The method of claim 14, wherein compensating for transmitter signal timing offsets comprises:
    receiving a data table identifying system transmitter time offsets and locations; and
    adjusting the time of arrival of the PPC signals for each transmitter by its transmitter time offset.

16. The method of claim 14, wherein compensating for transmitter signal timing offsets comprises:
    receiving a data table identifying system transmitter PPC offsets, transmitter times and locations; and
    adjusting the time of arrival of the PPC signals for each transmitter to system time.

17. The method of claim 1, further comprising:
    monitoring trends in estimated SINR estimates for a plurality of signal sampling window position hypotheticals; and
    repositioning the signal sampling window position to the second window position hypothetical when it is determined that an SINR estimate trend of a current window position hypothetical is decreasing while and an SINR trend of a second window position hypothetical is increasing and the SINR estimates of the current and second window position hypotheticals are close.

18. The method of claim 1, further comprising:
generating a second channel model and a third channel model, wherein the second channel model is longer than the third channel model and shorter than the first channel model;
identifying one or more signal sampling window position hypotheticals for each of the second and third channel models;
calculating a SINR for each of the one or more signal sampling window position hypotheticals for each of the second and third channel models; and
comparing the SINR values for both the second and third window position hypotheticals to select the most favorable.

19. The method of claim 18, further comprising:
determining when a high Doppler shift condition exists;
estimating SINR values for multiple position channel estimation windows;
choosing a best SINR for both the third and second channel estimates; and
increasing the second window SINR requirement when it is determined that a high Doppler shift condition exists.

20. A wireless receiver device, comprising:
a processor;
a receiver circuit coupled to the processor and configured to receive transmissions from a broadcast network,
wherein the processor is configured with processor-executable instructions to perform operations comprising:
generating a first channel model of transmitters within reception range using a transmitted signal that enables determination of a virtually alias-free channel estimate;
using the first channel model to position the signal sampling window
determining a location of the receiver device; and
identify transmitters that are unshadowed by terrain at the location of the receiver device,
wherein the processor is configured with processor-executable instructions to perform operations such that using the first channel model to position the signal sampling window comprises selecting a signal sampling window position based on the first channel model and transmitters which are not shadowed by terrain at the location of the receiver device.

21. The wireless receiver device of claim 20, wherein the processor is configured with processor-executable instructions to perform operations further comprising continuously refining the first channel model of transmitters based upon ongoing reception of the transmitted signal.

22. The wireless receiver device of claim 20, wherein the processor is configured with processor-executable instructions to perform operations further comprising calculating a signal to interference and noise ratio (SINR) estimate.

23. The wireless receiver device of claim 20, wherein the processor is configured with processor-executable instructions to perform operations such that using the first channel model to position the signal sampling window comprises:
using the first channel model to identify one or more signal sampling window position hypotheticals;
calculating a signal to interference and noise ratio (SINR) for each of the one or more signal sample window position hypotheticals; and
positioning the signal sampling window at the one or more signal sampling window position hypotheticals having the best calculated SINR.

24. The wireless receiver device of claim 23, wherein the processor is configured with processor-executable instructions to perform operations such that the SINR is calculated as the ratio of combining carriers to interfering carriers plus channel noise.

25. The wireless receiver device of claim 24, wherein the processor is configured with processor-executable instructions to perform operations such that the calculation of the ratio of combining carriers to interfering carriers is based upon combining characteristics of the wireless receiver device.

26. The wireless receiver device of claim 20, wherein the processor is configured with processor-executable instructions to perform operations further comprising monitoring trends in positions of the wireless receiver device, wherein the processor is configured with processor-executable instructions to perform operations such that using the first channel model to position the signal sampling window comprises:
using the first channel model to identify one or more signal sampling window position hypotheticals;
calculating a signal to interference and noise ratio (SINR) for each of the one or more signal sampling window position hypotheticals;
identifying the one or more signal sample window position hypotheticals having a best SINR; and
positioning the signal sampling window based upon the identified signal sampling window position hypothetical having a best SINR and the monitored trends in position of the wireless receiver device.

27. The wireless receiver device of claim 20, wherein identifying transmitters that are unshadowed comprises comparing the location of the receiver device to a terrain database.

28. The wireless receiver device of claim 27, wherein the processor is configured with processor-executable instructions to perform operations further comprising logging the selected signal sampling window position and the determined location of the receiver device in memory.

29. The wireless receiver device of claim 20, wherein the processor is configured with processor-executable instructions to perform operations further comprising testing a first signal sampling window position by:
predicting a signal to interference and noise ratio (SINR) with the signal sampling window in a second position different than the first position;
repositioning the signal sampling window to the second position;
measuring the SINR with the signal sampling window in the second position; and
comparing the predicted SINR to the measured SINR.

30. The wireless receiver device of claim 29, wherein the processor is configured with processor-executable instructions to perform operations further comprising using a heuristic method for positioning the signal sampling window when the predicted SINR differs significantly from the measured SINR.

31. The wireless receiver device of claim 29, wherein the processor is configured with processor-executable instructions to perform operations further comprising:
selecting an alternate signal sampling window hypothesis that has similar predicted performance, but at a different window location when the predicted SINR differs significantly from the measured SINR for the most recent utilized hypothesis.

32. The wireless receiver device of claim 20, wherein:
the receiver circuit is configured to receive transmissions from a MediaFLO® broadcast network; and
the processor is configured with processor-executable instructions to perform operations such that generating the first channel model comprises receiving positioning pilot channel (PPC) signals from transmitters in the MediaFLO® broadcast network and using a time of arrival of the PPC signals and known positions of the transmitters.

33. The wireless receiver device of claim 32, wherein the processor is configured with processor-executable instructions to perform operations such that generating the first channel model further comprises compensating for transmitter signal timing offsets.

34. The wireless receiver device of claim 33, wherein the processor is configured with processor-executable instructions to perform operations such that compensating for transmitter signal timing offsets comprises:
receiving a data table identifying system transmitter time offsets and locations; and
adjusting the time of arrival of the PPC signals for each transmitter by its transmitter time offset.

35. The wireless receiver device of claim 33, wherein the processor is configured with processor-executable instructions to perform operations such that compensating for transmitter signal timing offsets comprises:
receiving a data table identifying system transmitter PPC offsets, transmitter times and locations; and
adjusting the time of arrival of the PPC signals for each transmitter to system time.

36. The wireless receiver device of claim 20, wherein the processor is configured with processor-executable instructions to perform operations further comprising:
monitoring trends in estimated SINR estimates for a plurality of signal sampling window position hypotheticals; and
repositioning the signal sampling window position to the second window position hypothetical when it is determined that an SINR estimate trend of a current window position hypothetical is decreasing while and an SINR trend of a second window position hypothetical is increasing and the SINR estimates of the current and second window position hypotheticals are close.

37. The wireless receiver device of claim 20, wherein the processor is configured with processor-executable instructions to perform operations further comprising:
generating a second channel model and a third channel model, wherein the second channel model is longer than the third channel model and shorter than the first channel model;
identifying one or more signal sampling window position hypotheticals for each of the second and third channel models;
calculating a SINR for each of the one or more signal sampling window position hypotheticals for each of the second and third channel models; and
comparing the SINR values for both the second and third window position hypotheticals to select the most favorable.

38. The wireless receiver device of claim 37, wherein the processor is configured with processor-executable instructions to perform operations further comprising:
determining when a high Doppler shift condition exists;
estimating SINR values for multiple position channel estimation windows;
choosing a best SINR for both the third and second channel estimates; and
increasing the second window SINR requirement when it is determined that a high Doppler shift condition exists.

39. A wireless receiver device, comprising:
means for generating a first channel model of transmitters within reception range using a transmitted signal that enables determination of a virtually alias-free channel estimate;
means for using the first channel model to position the signal sampling window;
means for determining a location of the receiver device; and
means for identifying transmitters that are unshadowed by terrain at the location of the receiver device,
wherein means for using the first channel model to position the signal sampling window comprises means for selecting a signal sampling window position based on the first channel model and transmitters which are not shadowed by terrain at the location of the receiver device.

40. The wireless receiver device of claim 39, further comprising means for continuously refining the first channel model of transmitters based upon ongoing reception of the transmitted signal.

41. The wireless receiver device of claim 39, further comprising means for calculating a signal to interference and noise ratio (SINR) estimate.

42. The wireless receiver device of claim 39, wherein means for using the first channel model to position the signal sampling window comprises:
means for using the first channel model to identify one or more signal sampling window position hypotheticals;
means for calculating a signal to interference and noise ratio (SINR) for each of the one or more signal sample window position hypotheticals; and
means for positioning the signal sampling window at the one or more signal sampling window position hypotheticals having the best calculated SINR.

43. The wireless receiver device of claim 42, further comprising means for calculating the SINR as the ratio of combining carriers to interfering carriers plus channel noise.

44. The wireless receiver device of claim 43, wherein the calculation of the ratio of combining carriers to interfering carriers is based upon combining characteristics of the wireless receiver device.

45. The wireless receiver device of claim 39, further comprising means for monitoring trends in positions of the wireless receiver device,
wherein means for using the first channel model to position the signal sampling window comprises:
means for using the first channel model to identify one or more signal sampling window position hypotheticals;
means for calculating a signal to interference and noise ratio (SINR) for each of the one or more signal sampling window position hypotheticals;
means for identifying the one or more signal sample window position hypotheticals having a best SINR; and
means for positioning the signal sampling window based upon the identified signal sampling window position hypothetical having a best SINR and the monitored trends in position of the wireless receiver device.

46. The wireless receiver device of claim 39, wherein identifying transmitters that are unshadowed comprises a means for comparing the location of the receiver device to a terrain database.

47. The wireless receiver device of claim 46, further comprising means for logging the selected signal sampling window position and the determined location of the receiver device in memory.

48. The wireless receiver device of claim 39, further comprising means for testing a first signal sampling window position comprising:
  means for predicting a signal to interference and noise ratio (SINR) with the signal sampling window in a second position different than the first position;
  means for repositioning the signal sampling window to the second position;
  means for measuring the SINR with the signal sampling window in the second position; and
  means for comparing the predicted SINR to the measured SINR.

49. The wireless receiver device of claim 48, further comprising means for using a heuristic method for positioning the signal sampling window when the predicted SINR differs significantly from the measured SINR.

50. The wireless receiver device of claim 48, further comprising:
  means for selecting an alternate signal sampling window hypothesis that has similar predicted performance, but at a different window location when the predicted SINR differs significantly from the measured SINR for the most recent utilized hypothesis.

51. The wireless receiver device of claim 39, further comprising means for receiving transmissions from a Media-FLO® broadcast network,
  wherein means for generating the first channel model comprises means for receiving positioning pilot channel (PPC) signals from transmitters in the MediaFLO® broadcast network and using a time of arrival of the PPC signals and known positions of the transmitters.

52. The wireless receiver device of claim 51, wherein means for generating the first channel model further comprises means for compensating for transmitter signal timing offsets.

53. The wireless receiver device of claim 52, wherein means for compensating for transmitter signal timing offsets comprises:
  means for receiving a data table identifying system transmitter time offsets and locations; and
  means for adjusting the time of arrival of the PPC signals for each transmitter by its transmitter time offset.

54. The wireless receiver device of claim 52, wherein means for compensating for transmitter signal timing offsets comprises:
  means for receiving a data table identifying system transmitter PPC offsets, transmitter times and locations; and
  means for adjusting the time of arrival of the PPC signals for each transmitter to system time.

55. The wireless receiver device of claim 39, further comprising:
  means for monitoring trends in estimated SINR estimates for a plurality of signal sampling window position hypotheticals; and
  means for repositioning the signal sampling window position to the second window position hypothetical when it is determined that an SINR estimate trend of a current window position hypothetical is decreasing while and an SINR trend of a second window position hypothetical is increasing and the SINR estimates of the current and second window position hypotheticals are close.

56. The wireless receiver device of claim 39, further comprising:
  means for generating a second channel model and a third channel model, wherein the second channel model is longer than the third channel model and shorter than the first channel model;
  means for identifying one or more signal sampling window position hypotheticals for each of the second and third channel models;
  means for calculating a SINR for each of the one or more signal sampling window position hypotheticals for each of the second and third channel models; and
  means for comparing the SINR values for both the second and third window position hypotheticals to select the most favorable.

57. The wireless receiver device of claim 56, further comprising:
  means for determining when a high Doppler shift condition exists;
  means for estimating SINR values for multiple position channel estimation windows;
  means for choosing a best SINR for both the third and second channel estimates; and
  means for increasing the second window SINR requirement when it is determined that a high Doppler shift condition exists.

58. A non-transitory processor-readable medium having stored thereon processor-executable instructions configured to cause a processor of a wireless receiver device to perform operations comprising:
  generating a first channel model of transmitters within reception range using a transmitted signal that enables determination of a virtually alias-free channel estimate;
  using the first channel model to position the signal sampling window;
  determining a location of the receiver device; and
  identifying transmitters that are unshadowed by terrain at the location of the receiver device,
  wherein the stored processor-executable instructions are configured to cause a processor of a wireless receiver device to perform operations such that using the first channel model to position the signal sampling window comprises selecting a signal sampling window position based on the first channel model and transmitters which are not shadowed by terrain at the location of the receiver device.

59. The non-transitory processor-readable medium of claim 58, wherein the stored processor-executable instructions are configured to cause a processor of a wireless receiver device to perform operations further comprising continuously refining the first channel model of transmitters based upon ongoing reception of the transmitted signal.

60. The non-transitory processor-readable medium of claim 58, wherein the stored processor-executable instructions are configured to cause a processor of a wireless receiver device to perform operations further comprising calculating a signal to interference and noise ratio (SINR) estimate.

61. The non-transitory processor-readable medium of claim 58, wherein the stored processor-executable instructions are configured to cause a processor of a wireless receiver device to perform operations such that using the first channel model to position the signal sampling window comprises:
  using the first channel model to identify one or more signal sampling window position hypotheticals;
  calculating a signal to interference and noise ratio (SINR) for each of the one or more signal sample window position hypotheticals; and
  positioning the signal sampling window at the one or more signal sampling window position hypotheticals having the best calculated SINR.

62. The non-transitory processor-readable medium of claim 61, wherein the stored processor-executable instructions are configured to cause a processor of a wireless receiver device to perform operations such that the SINR is calculated as the ratio of combining carriers to interfering carriers plus channel noise.

63. The non-transitory processor-readable medium of claim 62, wherein the stored processor-executable instructions are configured to cause a processor of a wireless receiver device to perform operations such that the calculation of the ratio of combining carriers to interfering carriers is based upon combining characteristics of the non-transitory processor-readable medium.

64. The non-transitory processor-readable medium of claim 58, wherein the stored processor-executable instructions are configured to cause a processor of a wireless receiver device to perform operations further comprising monitoring trends in positions of the wireless receiver device,
wherein using the first channel model to position the signal sampling window comprises:
using the first channel model to identify one or more signal sampling window position hypotheticals;
calculating a signal to interference and noise ratio (SINR) for each of the one or more signal sampling window position hypotheticals;
identifying the one or more signal sample window position hypotheticals having a best SINR; and
positioning the signal sampling window based upon the identified signal sampling window position hypothetical having a best SINR and the monitored trends in position of the wireless receiver device.

65. The non-transitory processor-readable medium of claim 58, wherein
identifying transmitters that are unshadowed by terrain comprises
comparing the location of the receiver device to a terrain database.

66. The non-transitory processor-readable medium of claim 65, wherein the stored processor-executable instructions are configured to cause a processor of a wireless receiver device to perform operations further comprising logging the selected signal sampling window position and the determined location of the receiver device in memory.

67. The non-transitory processor-readable medium of claim 58, wherein the stored processor-executable instructions are configured to cause a processor of a wireless receiver device to perform operations further comprising testing a first signal sampling window position by:
predicting a signal to interference and noise ratio (SINR) with the signal sampling window in a second position different than the first position;
repositioning the signal sampling window to the second position;
measuring the SINR with the signal sampling window in the second position; and
comparing the predicted SINR to the measured SINR.

68. The non-transitory processor-readable medium of claim 67, wherein the stored processor-executable instructions are configured to cause a processor of a wireless receiver device to perform operations further comprising using a heuristic method for positioning the signal sampling window when the predicted SINR differs significantly from the measured SINR.

69. The non-transitory processor-readable medium of claim 67, wherein the stored processor-executable instructions are configured to cause a processor of a wireless receiver device to perform operations further comprising:
selecting an alternate signal sampling window hypothesis that has similar predicted performance, but at a different window location when the predicted SINR differs significantly from the measured SINR for the most recent utilized hypothesis.

70. The non-transitory processor-readable medium of claim 58, wherein the wireless receiver device is configured to receive transmissions from a MediaFLO® broadcast network, and
wherein the stored processor-executable instructions are configured to cause a processor of a wireless receiver device to perform operations such that the processor is configured with processor-executable instructions to perform operations such that generating the first channel model comprises receiving positioning pilot channel (PPC) signals from transmitters in the MediaFLO® broadcast network and using a time of arrival of the PPC signals and known positions of the transmitters.

71. The non-transitory processor-readable medium of claim 70, wherein the stored processor-executable instructions are configured to cause a processor of a wireless receiver device to perform operations such that generating the first channel model further comprises compensating for transmitter signal timing offsets.

72. The non-transitory processor-readable medium of claim 71, wherein the stored processor-executable instructions are configured to cause a processor of a wireless receiver device to perform operations such that compensating for transmitter signal timing offsets comprises:
receiving a data table identifying system transmitter time offsets and locations; and
adjusting the time of arrival of the PPC signals for each transmitter by its transmitter time offset.

73. The non-transitory processor-readable medium of claim 71, wherein the stored processor-executable instructions are configured to cause a processor of a wireless receiver device to perform operations such that compensating for transmitter signal timing offsets comprises:
receiving a data table identifying system transmitter PPC offsets, transmitter times and locations; and
adjusting the time of arrival of the PPC signals for each transmitter to system time.

74. The non-transitory processor-readable medium of claim 58, wherein the stored processor-executable instructions are configured to cause a processor of a wireless receiver device to perform operations further comprising:
monitoring trends in estimated SINR estimates for a plurality of signal sampling window position hypotheticals; and
repositioning the signal sampling window position to the second window position hypothetical when it is determined that an SINR estimate trend of a current window position hypothetical is decreasing while and an SINR trend of a second window position hypothetical is increasing and the SINR estimates of the current and second window position hypotheticals are close.

75. The non-transitory processor-readable medium of claim 58, wherein the stored processor-executable instructions are configured to cause a processor of a wireless receiver device to perform operations further comprising:
generating a second channel model and a third channel model, wherein the second channel model is longer than the third channel model and shorter than the first channel model;
identifying one or more signal sampling window position hypotheticals for each of the second and third channel models;

calculating a SINR for each of the one or more signal sampling window position hypotheticals for each of the second and third channel models; and comparing the SINR values for both the second and third window position hypotheticals to select the most favorable.

76. The non-transitory processor-readable medium of claim 75, wherein the stored processor-executable instructions are configured to cause a processor of a wireless receiver device to perform operations further comprising:

determining when a high Doppler shift condition exists;

estimating SINR values for multiple position channel estimation windows;

choosing a best SINR for both the third and second channel estimates; and increasing the second window SINR requirement when it is determined that a high Doppler shift condition exists.

* * * * *